United States Patent
Wang et al.

(10) Patent No.: US 12,536,628 B2
(45) Date of Patent: Jan. 27, 2026

(54) IMAGE ENHANCEMENT METHOD AND APPARATUS

(71) Applicant: HUAWEI TECHNOLOGIES CO., LTD., Shenzhen (CN)

(72) Inventors: Tao Wang, Beijing (CN); Xian Wang, Beijing (CN); Fenglong Song, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 503 days.

(21) Appl. No.: 17/687,374

(22) Filed: Mar. 4, 2022

(65) Prior Publication Data
US 2022/0188999 A1    Jun. 16, 2022

Related U.S. Application Data

(63) Continuation of application No. PCT/CN2020/113530, filed on Sep. 4, 2020.

(30) Foreign Application Priority Data

Sep. 4, 2019   (CN) .......................... 201910831006.6

(51) Int. Cl.
*G06T 5/92*      (2024.01)
*G06T 5/50*      (2006.01)
(Continued)

(52) U.S. Cl.
CPC .................. *G06T 5/92* (2024.01); *G06T 5/50* (2013.01); *G06T 5/60* (2024.01); *G06T 7/162* (2017.01);
(Continued)

(58) Field of Classification Search
CPC ........... G06T 2207/20072; G06T 2207/20081; G06T 2207/20084; G06T 2207/20221;
(Continued)

(56) References Cited

U.S. PATENT DOCUMENTS

| | | | |
|---|---|---|---|
| 8,731,318 B2* | 5/2014 | Keshet | ...................... G06T 5/73 |
| | | | 382/302 |
| 2009/0034864 A1* | 2/2009 | Kisilev | ...................... G06T 5/75 |
| | | | 382/263 |

(Continued)

FOREIGN PATENT DOCUMENTS

| | | |
|---|---|---|
| CN | 105608676 A | 5/2016 |
| CN | 107689036 A | 2/2018 |

(Continued)

OTHER PUBLICATIONS

Li et al., "Pedestrian attribute recognition by joint visual-semantic reasoning and knowledge distillation", IJCAI'19: Proceedings of the 28th International Joint Conference on Artificial Intelligence, Aug. 10, 2019. (Year: 2019).*

(Continued)

*Primary Examiner* — Kenny A Cese
(74) *Attorney, Agent, or Firm* — Leydig, Voit & Mayer, Ltd.

(57) ABSTRACT

This application relates to an image enhancement technology in the field of computer vision in the field of artificial intelligence, and provides an image enhancement method and apparatus. This application relates to the field of artificial intelligence, and specifically, to the field of computer vision. The method includes: adjusting a pixel value of a to-be-processed image, to obtain K images, where pixel values of the K images are different, and K is a positive integer greater than 1; extracting local features of the K images; extracting a global feature of the to-be-processed image; and performing image enhancement processing on the to-be-processed image based on the global feature and the local features, to obtain an image-enhanced output image. This method helps to improve the effect of image quality enhancement processing.

19 Claims, 11 Drawing Sheets

(51) Int. Cl.
  *G06T 5/60* (2024.01)
  *G06T 7/162* (2017.01)
  *G06V 10/26* (2022.01)
  *G06V 10/30* (2022.01)
  *G06V 10/44* (2022.01)
  *G06V 10/80* (2022.01)
  *G06V 10/82* (2022.01)

(52) U.S. Cl.
  CPC .............. *G06V 10/26* (2022.01); *G06V 10/30* (2022.01); *G06V 10/454* (2022.01); *G06V 10/806* (2022.01); *G06V 10/82* (2022.01); *G06T 2207/20072* (2013.01); *G06T 2207/20081* (2013.01); *G06T 2207/20084* (2013.01); *G06T 2207/20221* (2013.01)

(58) Field of Classification Search
  CPC .... G06T 5/00; G06T 5/50; G06T 5/60; G06T 5/92; G06T 7/162; G06V 10/26; G06V 10/30; G06V 10/454; G06V 10/806; G06V 10/82
  USPC ........................................................ 382/173
  See application file for complete search history.

(56) References Cited

U.S. PATENT DOCUMENTS

| | | | |
|---|---|---|---|
| 2016/0027148 A1 | 1/2016 | Choudhury | |
| 2017/0351941 A1* | 12/2017 | Mishra | G06V 10/82 |
| 2018/0053299 A1 | 2/2018 | Gholap et al. | |
| 2019/0328348 A1* | 10/2019 | De Man | G06T 5/20 |
| 2019/0355098 A1* | 11/2019 | Ferrés | G06T 5/70 |
| 2020/0043139 A1* | 2/2020 | Chou | G06T 3/4007 |
| 2020/0302576 A1* | 9/2020 | Xu | G06N 3/084 |
| 2020/0334793 A1* | 10/2020 | Chen | G06T 7/194 |

FOREIGN PATENT DOCUMENTS

| | | |
|---|---|---|
| CN | 108492271 A | 9/2018 |
| CN | 109635141 A | 4/2019 |
| CN | 109993707 A | 7/2019 |
| WO | 2020177607 A1 | 9/2020 |

OTHER PUBLICATIONS

Gharbi et al., "Deep Bilateral Learning for Real-Time Image Enhancement," ACM Transactions on Graphics, vol. 36, No. 4, Article 118, total 12 pages (Publication date: Jul. 2017).

Chen et al., "Deep Photo Enhancer: Unpaired Learning for Image Enhancement from Photographs with GANs," total 9 pages (2018).

Kiaonan et al., "High Dynamic Range Image Generation Method by Fusing Multi-Level Gamma-Transformed mages," Laser and Optoelectronics Progress, total 17 pages (2018). With English translation.

Zhang et al., "Beyond a Gaussian Denoiser: Residual Learning of Deep CNN for Image Denoising," total 13 pages (2016).

Chen et al., "Learning to See in the Dark," CVPR, total 10 pages (2018).

Chen et al., "Bilateral Guided Upsampling," total 8 pages (2016).

Wang et al., "Underexposed Photo Enhancement using Deep Illumination Estimation," CVPR, total 9 pages (2019).

Wu et al., "Fast End-to-End Trainable Guided Filter," CVPR 2018, total 13 pages (2018).

Wang et al., "Stereoscopic Dark Flash for Low-light Photography," Arxiv 2019, total 11 pages (2019).

* cited by examiner

IMAGE ENHANCEMENT METHOD AND APPARATUS

CROSS-REFERENCE TO RELATED APPLICATIONS

This application is a continuation of International Application No. PCT/CN2020/113530, filed on Sep. 4, 2020, which claims priority to Chinese Patent Application No. 201910831006.6, filed on Sep. 4, 2019. The disclosures of the aforementioned applications are hereby incorporated by reference in their entireties.

TECHNICAL FIELD

This application relates to the field of artificial intelligence, and more particularly, to an image enhancement method and apparatus.

BACKGROUND

Computer vision is an integral part of various intelligent/autonomic systems in various application fields, such as manufacturing industry, inspection, document analysis, medical diagnosis, and military affairs. The computer vision is knowledge about how to use a camera/video camera and a computer to obtain required data and information of a photographed subject. To be vivid, eyes (the camera/video camera) and a brain (an algorithm) are mounted on the computer to replace human eyes to recognize, track, and measure a target, so that the computer can perceive an environment. The "perceiving" may be considered as extracting information from a perceptual signal. Therefore, the computer vision may also be considered as a science of studying how to enable an artificial system to perform "perceiving" in an image or multi-dimensional data. Generally, computer vision uses various imaging systems functioning like visual organs to obtain input information, and then the computer, functioning like a brain, processes and interprets the input information. An ultimate study objective of the computer vision is to enable the computer to observe and understand the world through vision in a way that human beings do, and to have a capability of autonomously adapting to the environment.

In the field of computer vision, image quality enhancement processing usually needs to be performed on digital images. For example, in various application scenarios such as mobile phone photographing, automated driving, and a safe city, the image quality enhancement processing may be first performed on images or videos, and then enhanced images or videos are identified or analyzed. However, in many cases, an effect of the image quality enhancement processing is not perfect.

Therefore, how to improve the effect of the image quality enhancement processing becomes an urgent technical problem to be resolved.

SUMMARY

This application provides an image enhancement method and apparatus, which can improve an effect of image quality enhancement processing.

According to a first aspect, an image enhancement method is provided. The method includes:

adjusting a pixel value of a to-be-processed image, to obtain K images, where pixel values of the K images are different, and K is a positive integer greater than 1; extracting local features of the K images; extracting a global feature of the to-be-processed image; and performing image enhancement processing on the to-be-processed image based on the global feature and the local features, to obtain an image-enhanced output image.

In the image enhancement method in this embodiment of this application, a plurality of images having different pixel values are obtained by adjusting the pixel value of the to-be-processed image, and image quality enhancement processing is performed on the to-be-processed image by using the plurality of images having different pixel values, so that more local detail information can be obtained from the plurality of images having different pixel values, to implement image enhancement on the to-be-processed image. The method can improve an effect of image quality enhancement processing.

In addition, the K images are obtained by adjusting the pixel value of the to-be-processed image, to ensure that picture contents of the K images participating in the image enhancement processing are consistent and have no pixel offset, so that a ghost image caused by inconsistent picture contents or a pixel offset can be avoided.

Optionally, the local features are features extracted from local regions of the images, and include edges, angular points, lines, curves, and regions with a special attribute; and the global feature refers to an overall attribute of the image, and includes a color feature, a texture feature, a shape feature, a histogram, or the like.

Optionally, the K images can be obtained by adjusting the pixel value of the to-be-processed image for K times. In this case, the K images are all obtained by adjusting the pixel value of the to-be-processed image, that is, the K images do not include the to-be-processed image.

Alternatively, K−1 images can be obtained by adjusting the pixel value of the to-be-processed image for K−1 times, and the K images can be obtained based on the K−1 images and the to-be-processed image. In this case, the K images include the to-be-processed image, and the K−1 images other than the to-be-processed image in the K images are obtained by adjusting the pixel value of the to-be-processed image.

Optionally, the to-be-processed image may be an image (a low-resolution image) obtained after an original image of the to-be-processed image is downsampled.

In this embodiment of this application, a to-be-enhanced image (namely, the original image of the to-be-processed image) may be downsampled first to obtain the low-resolution image (namely, the to-be-processed image), and then a feature of the low-resolution image is extracted. In this way, a calculation amount of the image enhancement processing is reduced.

With reference to the first aspect, in some implementations of the first aspect, the adjusting a pixel value of a to-be-processed image, to obtain K images includes: increasing and/or decreasing all pixel values of the to-be-processed image through non-linear transformation, to obtain the K images.

In this embodiment of this application, the K images can be conveniently obtained by increasing and/or decreasing all the pixel values of the to-be-processed image through the non-linear transformation, so that more local detail information can be obtained from the K images.

Optionally, the non-linear transformation may be gamma transformation (or γ transformation), or may be another non-linear transformation method capable of adjusting a pixel value of an image. This is not limited in this embodiment of this application.

With reference to the first aspect, in some implementations of the first aspect, the method further includes: performing semantic segmentation on the to-be-processed image, to obtain a semantic segmentation graph; and performing feature extraction on the semantic segmentation graph, to obtain a semantic condition, where the semantic condition includes semantic information of the to-be-processed image, and at least one of the local features of the K images is extracted based on the semantic condition.

In this embodiment of this application, local features of at least one of the K images are extracted based on the semantic segmentation graph, and a semantic difference between different local regions can be reflected in the image-enhanced image.

Further, feature extraction is performed on the semantic segmentation graph, to obtain the semantic condition, and the local features of at least one of the K images are extracted based on the semantic condition, so that the semantic difference between different local regions can be better reflected in the image-enhanced image.

With reference to the first aspect, in some implementations of the first aspect, at least one of the local features of the K images is extracted based on a first semantic feature and a second semantic feature, where the first semantic feature and the second semantic feature are determined based on the semantic condition.

With reference to the first aspect, in some implementations of the first aspect, at least one of the local features of the K images is determined based on a residual estimated value, where the residual estimated value is determined based on the first semantic feature, the second semantic feature, and an image feature of the to-be-processed image.

With reference to the first aspect, in some implementations of the first aspect, the method further includes: performing feature fusion on the local features of the K images, to obtain a local fusion feature. The performing image enhancement processing on the to-be-processed image based on the global feature and the local features, to obtain an image-enhanced output image includes: performing image enhancement processing on the to-be-processed image based on the global feature and the local fusion feature, to obtain the image-enhanced output image.

With reference to the first aspect, in some implementations of the first aspect, the performing image enhancement processing on the to-be-processed image based on the global feature and the local features, to obtain an image-enhanced output image includes: performing feature fusion on the global feature and the local features, to obtain a fusion feature; and performing image enhancement processing on the to-be-processed image based on the fusion feature, to obtain the image-enhanced output image.

In this embodiment of this application, the fusion feature is obtained by performing feature fusion on the global feature and the local features, rather than simply adding the global feature to the local features. Therefore, a local region of the image-enhanced image can be prevented from having a same global feature, so that the effect of image enhancement processing can be improved.

Optionally, the feature fusion may be performed on the global feature and the local features by using a neural network, to obtain the fusion feature.

With reference to the first aspect, in some implementations of the first aspect, the performing feature fusion on the global feature and the local features, to obtain a fusion feature includes: performing feature extraction on the global feature, to obtain a first global feature and a second global feature; performing addition on the first global feature and the local features, to obtain a candidate fusion feature; and performing concatenation and convolution on the candidate fusion feature and the second global feature, to obtain the fusion feature.

In this embodiment of this application, after the global feature is divided into two independent channels (namely, the first global feature and the second global feature), the first global feature and the second global feature are fused with the local features, so that the model can learn more accurate global information, and color transition of different illumination and different semantic in the to-be-processed image can be more natural.

With reference to the first aspect, in some implementations of the first aspect, the performing feature fusion on the global feature and the local features, to obtain a fusion feature includes: performing feature extraction on the global feature, to obtain a first global feature and a second global feature; performing concatenation and convolution on the first global feature and the local features, to obtain a candidate fusion feature; and performing addition on the candidate fusion feature and the second global feature, to obtain the fusion feature.

In this embodiment of this application, after the global feature is divided into two independent channels (namely, the first global feature and the second global feature), the first global feature and the second global feature are fused with the local features, so that the model can learn more accurate global information, and color transition of different illumination and different semantic in the to-be-processed image can be more natural.

With reference to the first aspect, in some implementations of the first aspect, the to-be-processed image is the image obtained after the original image of the to-be-processed image is downsampled. The performing image enhancement processing on the to-be-processed image based on the global feature and the local features, to obtain an image-enhanced output image includes: performing image enhancement processing on the original image of the to-be-processed image based on the global feature and the local features, to obtain the image-enhanced output image.

With reference to the first aspect, in some implementations of the first aspect, when the to-be-processed image is the image obtained after the original image of the to-be-processed image is downsampled, the performing image enhancement processing on the to-be-processed image based on the fusion feature, to obtain the image-enhanced output image includes: upsampling the fusion feature based on the original image of the to-be-processed image, to obtain a target fusion feature; and performing image enhancement processing on the original image of the to-be-processed image based on the target fusion feature, to obtain the image-enhanced output image.

According to a second aspect, an image enhancement apparatus is provided, including: a pixel adjustment unit, configured to adjust a pixel value of a to-be-processed image, to obtain K images, where pixel values of the K images are different, and K is a positive integer greater than 1; a local feature extraction unit, configured to extract local features of the K images; a global feature extraction unit, configured to extract a global feature of the to-be-processed image; and an image enhancement unit, configured to perform image enhancement processing on the to-be-processed image based on the global feature and the local features, to obtain an image-enhanced output image.

The image enhancement apparatus in this embodiment of this application adjusts the pixel value of the to-be-processed image to obtain a plurality of images having different pixel values, and performs image quality enhancement processing on the to-be-processed image by using the plurality of images having different pixel values, so that more local detail information can be obtained from the plurality of images having different pixel values, to implement image enhancement on the to-be-processed image. The method can improve an effect of image quality enhancement processing.

In addition, the K images are obtained by adjusting the pixel value of the to-be-processed image, to ensure that picture contents of the K images participating in the image enhancement processing are consistent and have no pixel offset, so that a ghost image caused by inconsistent picture contents or a pixel offset can be avoided.

Optionally, the local features are features extracted from local regions of the images, and include edges, angular points, lines, curves, and regions with a special attribute; and the global feature refers to an overall attribute of the image, and includes a color feature, a texture feature, a shape feature, a histogram, or the like.

Optionally, the K images can be obtained by adjusting the pixel value of the to-be-processed image for K times. In this case, the K images are all obtained by adjusting the pixel value of the to-be-processed image, that is, the K images do not include the to-be-processed image.

Alternatively, K−1 images can be obtained by adjusting the pixel value of the to-be-processed image for K−1 times, and the K images can be obtained based on the K−1 images and the to-be-processed image. In this case, the K images include the to-be-processed image, and the K−1 images other than the to-be-processed image in the K images are obtained by adjusting the pixel value of the to-be-processed image.

Optionally, the to-be-processed image may be an image (a low-resolution image) obtained after an original image of the to-be-processed image is downsampled.

In this embodiment of this application, a to-be-enhanced image (namely, the original image of the to-be-processed image) may be downsampled first to obtain the low-resolution image (namely, the to-be-processed image), and then a feature of the low-resolution image is extracted. In this way, a calculation amount of the image enhancement processing is reduced.

With reference to the second aspect, in some implementations of the second aspect, the pixel adjustment unit is specifically configured to: increase and/or decrease all pixel values of the to-be-processed image through non-linear transformation, to obtain the K images.

In this embodiment of this application, the K images can be conveniently obtained by increasing and/or decreasing all the pixel values of the to-be-processed image through the non-linear transformation, so that more local detail information can be obtained from the K images.

Optionally, the non-linear transformation may be gamma transformation (or γ transformation), or may be another non-linear transformation method capable of adjusting a pixel value of an image. This is not limited in this embodiment of this application.

With reference to the second aspect, in some implementations of the second aspect, the apparatus further includes: a semantic segmentation unit, configured to: perform semantic segmentation on the to-be-processed image, to obtain a semantic segmentation graph. The apparatus further includes a semantic condition generation unit, configured to: perform feature extraction on the semantic segmentation graph, to obtain a semantic condition, where the semantic condition includes semantic information of the to-be-processed image, and at least one of the local features of the K images is extracted based on the semantic condition.

In this embodiment of this application, local features of at least one of the K images are extracted based on the semantic segmentation graph, and a semantic difference between different local regions can be reflected in the image-enhanced image.

Further, feature extraction is performed on the semantic segmentation graph, to obtain the semantic condition, and the local features of at least one of the K images are extracted based on the semantic condition, so that the semantic difference between different local regions can be better reflected in the image-enhanced image.

With reference to the second aspect, in some implementations of the second aspect, at least one of the local features of the K images is extracted based on a first semantic feature and a second semantic feature, where the first semantic feature and the second semantic feature are determined based on the semantic condition.

With reference to the second aspect, in some implementations of the second aspect, at least one of the local features of the K images is determined based on a residual estimated value, where the residual estimated value is determined based on the first semantic feature, the second semantic feature, and an image feature of the to-be-processed image.

With reference to the second aspect, in some implementations of the second aspect, the local feature extraction unit is further configured to: perform feature fusion on the local features of the K images, to obtain a local fusion feature. The image enhancement unit is specifically configured to: perform image enhancement processing on the to-be-processed image based on the global feature and the local fusion feature, to obtain the image-enhanced output image.

With reference to the second aspect, in some implementations of the second aspect, the image enhancement unit is specifically configured to: perform feature fusion on the global feature and the local features, to obtain a fusion feature; and perform image enhancement processing on the to-be-processed image based on the fusion feature, to obtain the image-enhanced output image.

In this embodiment of this application, the fusion feature is obtained by performing feature fusion on the global feature and the local features, rather than simply adding the global feature to the local features. Therefore, a local region of the image-enhanced image can be prevented from having a same global feature, so that the effect of image enhancement processing can be improved.

Optionally, the feature fusion may be performed on the global feature and the local features by using a neural network, to obtain the fusion feature.

With reference to the second aspect, in some implementations of the second aspect, the image enhancement unit is specifically configured to: perform feature extraction on the global feature, to obtain a first global feature and a second global feature; perform addition on the first global feature and the local features, to obtain a candidate fusion feature; and perform concatenation and convolution on the candidate fusion feature and the second global feature, to obtain the fusion feature.

In this embodiment of this application, after the global feature is divided into two independent channels (namely, the first global feature and the second global feature), the first global feature and the second global feature are fused with the local features, so that the model can learn more accurate global information, and color transition of different illumination and different semantic in the to-be-processed image can be more natural.

With reference to the second aspect, in some implementations of the second aspect, the image enhancement unit is specifically configured to: perform feature extraction on the global feature, to obtain a first global feature and a second global feature; perform concatenation and convolution on the first global feature and the local features, to obtain a candidate fusion feature; and perform addition on the candidate fusion feature and the second global feature, to obtain the fusion feature.

In this embodiment of this application, after the global feature is divided into two independent channels (namely, the first global feature and the second global feature), the first global feature and the second global feature are fused with the local features, so that the model can learn more accurate global information, and color transition of different illumination and different semantic in the to-be-processed image can be more natural.

With reference to the second aspect, in some implementations of the second aspect, the to-be-processed image is the image obtained after the original image of the to-be-processed image is downsampled. The image enhancement unit is specifically configured to: perform image enhancement processing on the original image of the to-be-processed image based on the global feature and the local features, to obtain the image-enhanced output image.

With reference to the second aspect, in some implementations of the second aspect, when the to-be-processed image is the image obtained after the original image of the to-be-processed image is downsampled, the image enhancement unit is specifically configured to: upsample the fusion feature based on the original image of the to-be-processed image, to obtain a target fusion feature; and perform image enhancement processing on the original image of the to-be-processed image based on the target fusion feature, to obtain the image-enhanced output image.

According to a third aspect, an image enhancement apparatus is provided. The apparatus includes: a memory, configured to store a program; and a processor, configured to execute the program stored in the memory. When the program stored in the memory is executed, the processor is configured to perform the method according to any one of the implementations of the first aspect.

The processor in the third aspect may be a central processing unit (CPU), or may be a combination of a CPU and a neural network operation processor. The neural network operation processor herein may include a graphics processing unit (GPU), a neural network processing unit (NPU), a tensor processing unit (TPU), and the like. The TPU is a dedicated integrated circuit of an artificial intelligence accelerator customized for machine learning by Google®.

According to a fourth aspect, a computer-readable medium is provided. The computer-readable medium stores program code to be executed by a device, and the program code includes instructions used to perform the method in any implementation of the first aspect.

According to a fifth aspect, a computer program product including instructions is provided. When the computer program product is run on a computer, the computer is enabled to perform the method in any implementation of the first aspect.

According to a sixth aspect, a chip is provided. The chip includes a processor and a data interface. The processor reads, through the data interface, instructions stored in a memory, to perform the method in any implementation of the first aspect.

Optionally, in an implementation, the chip may further include the memory. The memory stores the instructions. The processor is configured to execute the instructions stored in the memory. When the instructions are executed, the processor is configured to perform the method in any implementation of the first aspect.

The chip may be specifically a field-programmable gate array (FPGA) or an application-specific integrated circuit (ASIC).

According to a seventh aspect, an electronic device is provided. The electronic device includes the image enhancement apparatus in any aspect of the second aspect.

When the electronic device includes the image enhancement apparatus in any aspect of the second aspect, the electronic device may be specifically a terminal device or a server.

In the image enhancement method in the embodiments of this application, a plurality of images having different pixel values are obtained by adjusting the pixel value of the to-be-processed image, and image quality enhancement processing is performed on the to-be-processed image by using the plurality of images having different pixel values, so that more local detail information can be obtained from the plurality of images having different pixel values, to implement image enhancement on the to-be-processed image. The method can improve the effect of image quality enhancement processing.

DESCRIPTION OF EMBODIMENTS

Figure 1:
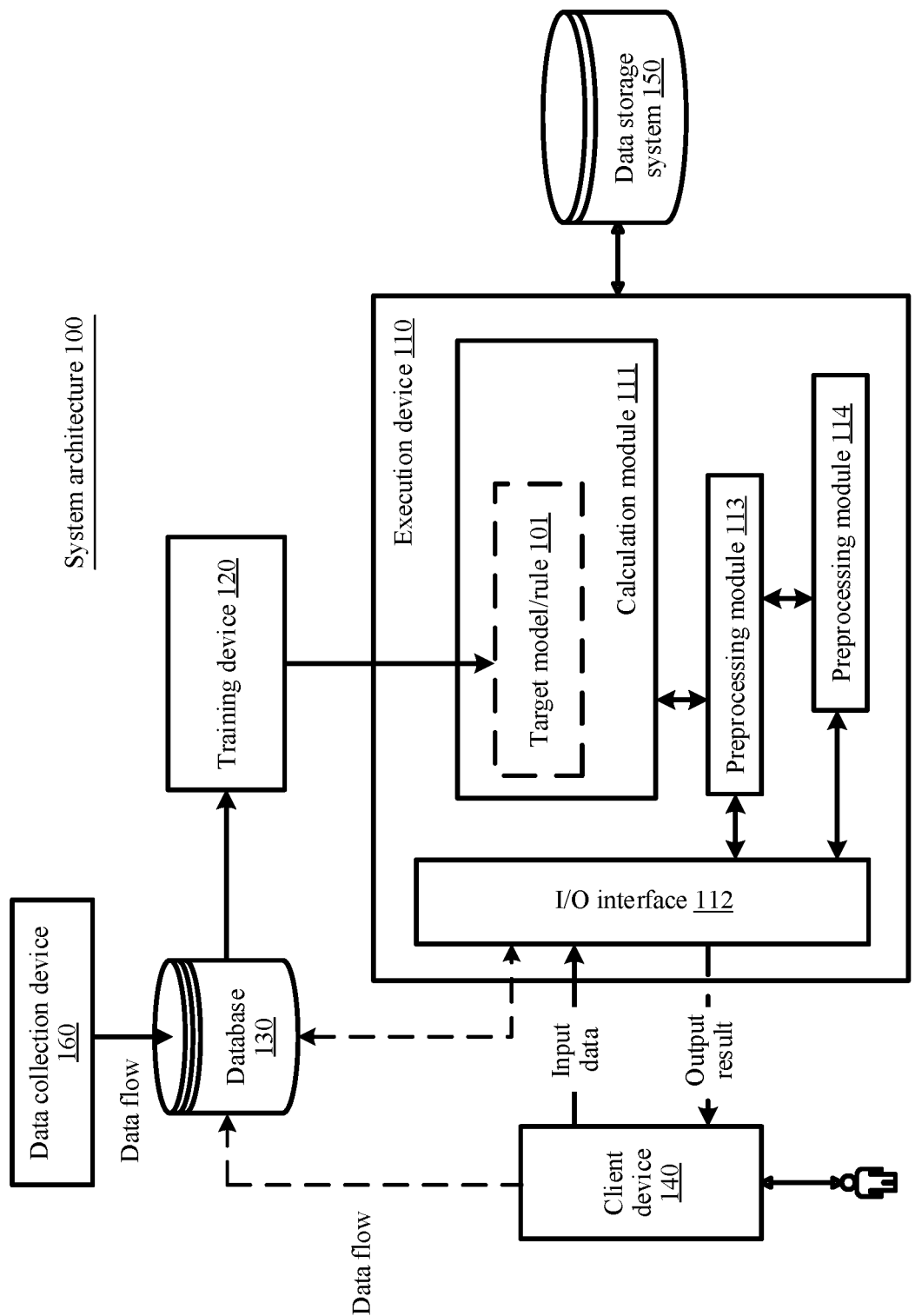
FIG. 1 is a schematic structural diagram of a system architecture according to an embodiment of this application.

The following describes technical solutions in this application with reference to accompanying drawings.

An image enhancement method provided in embodiments of this application can be applied to photographing, video recording, safe city, and man-machine interaction scenarios, and other scenarios requiring image restoration or image quality enhancement, such as image recognition, image classification, and the like.

It should be understood that an image in embodiments of this application may be a static image (or referred to as a static picture) or a moving image (or referred to as a moving picture). For example, the image in this application may be a video or a moving picture, or the image in this application may be a static picture or photo. For ease of description, the static image or the moving image is collectively referred to as an image in the following embodiments of this application.

The image enhancement method in the embodiments of this application may be specifically applied to a photographing scenario and an image recognition scenario, and the two scenarios are briefly described below.

Photographing (or video recording) scenario:

When a camera, a terminal device, or another intelligent electronic device is used for photographing, automatic image enhancement processing may be performed on an image obtained by photographing according to the image enhancement method in the embodiments of this application during or after photographing, to display an image with better quality.

By using the image enhancement method in the embodiments of this application, image quality can be improved, an image display effect can be improved, and accuracy of a visual algorithm (for example, image recognition or image classification) subsequently performed on an image can be improved.

Image recognition (video surveillance) scenario:

As artificial intelligence technologies are applied in a wider range, content in an image needs to be recognized in many cases, and when the image is recognized, image enhancement processing is usually performed on the image (for example, in a video surveillance scenario of a safe city, image enhancement processing needs to be performed on details in the dark where illumination is insufficient). By performing image enhancement processing on the image in an image recognition process or before a normal start of the image recognition by using the image enhancement method in the embodiments of this application, the quality of the image can be improved, thereby improving an effect of subsequent image recognition.

Film source enhancement scenario:

When a movie is played by using an intelligent terminal (for example, a smart TV or a smart screen), to display better image quality (picture quality), image enhancement processing may be performed on an original film source of the movie by using the image enhancement method in the embodiments of this application, so as to improve the picture quality of the film source and obtain a better visual sense.

For example, when an old movie is played by using a smart TV or a smart screen (a film source of the old movie is early and the picture quality of the film source is poor), image enhancement processing may be performed on the film source of the old movie by using the image enhancement method in the embodiments of this application, so that a visual sense of a modern movie can be displayed.

Image stylization (image beautification) scenario:

After photographing is performed by using a camera, a terminal device, or another intelligent electronic device, when image stylization processing or image beautification processing is performed, by using image processing software (for example, Photoshop® or Meitu™), on an image obtained by photographing, image enhancement processing may be performed on the image by using the image enhancement method in the embodiments of this application, to improve an image display effect.

The embodiments of this application relate to a large quantity of applications related to a neural network. To better understand the solutions of embodiments of this application, the following first describes related terms and concepts of the neural network that may be mentioned in embodiments of this application.

(1) Neural Network

The neural network may include a neural unit. The neural unit may be an operation unit that uses $x_s$ and an intercept 1 as an input, and an output of the operation unit may be shown in formula (1-1):

$$h_{W,b}(x) = f(W^T x) = f(\Sigma_{s=1}^n W_s x_s + b) \quad (1\text{-}1)$$

Herein, s=1, 2, ..., n, n is a natural number greater than 1, $W_s$ represents a weight of $x_s$, b represents a bias of the neuron, and f represents an activation function of the neuron, where the activation function is used to introduce a non-linear characteristic into the neural network, to convert an input signal in the neuron into an output signal. The output signal of the activation function may be used as an input of a next convolutional layer, and the activation function may be a sigmoid function. The neural network is a network constituted by connecting a plurality of single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (DNN), also referred to as a multi-layer neural network, may be understood as a neural network having a plurality of hidden layers. The DNN is divided based on positions of different layers. A neural network inside the DNN may be classified into three types: an input layer, a hidden layer, and an output layer. Generally, the first layer is the input layer, the last layer is the output layer, and the middle layer is the hidden layer. Layers are fully connected. To be specific, any neuron at an ith layer is necessarily connected to any neuron at an (i+1)th layer.

Although the DNN looks complex, the work of each layer is not complex, and is simply a linear relationship expression: $\vec{y} = \alpha(W \vec{x} + \vec{b})$ where $\vec{x}$ is an input vector, $\vec{y}$ is an output vector, $\vec{b}$ is an offset vector, W is a weight matrix (also referred to as a coefficient), and $\alpha(\ )$ is an activation function. At each layer, only such a simple operation is performed on the input vector $\vec{x}$ to obtain the output vector $\vec{y}$. Because the DNN has a large quantity of layers, there are a large quantity of coefficients W and offset vectors $\vec{b}$. These parameters are defined in the DNN as follows: The coefficient W is used as an example: It is assumed that in a three-layer DNN, a linear coefficient of a fourth neuron of a second layer to a second neuron of a third layer is defined as $W_{24}^3$. A superscript 3 represents a number of a layer in which the coefficient W is located, and a subscript corresponds to an index 2 of the third layer for output and an index 4 of the second layer for input.

To sum up, coefficients of a kth neuron of an (L−1)th layer to a jth neuron of an Lth layer are defined as $W_{jk}^L$.

It should be noted that the input layer does not have the parameter W. In the deep neural network, more hidden layers make the network more capable of describing a complex case in the real world. Theoretically, a model with more parameters has higher complexity and a larger "capacity". It indicates that the model can complete a more complex learning task. Training of the deep neural network is a process of learning a weight matrix, and a final objective of the training is to obtain a weight matrix of all layers of a trained deep neural network (a weight matrix formed by vectors W of many layers).

(3) Convolutional Neural Network

The convolutional neural network (CNN) is a deep neural network with a convolutional structure. The convolutional neural network includes a feature extractor including a convolutional layer and a sub-sampling layer. The feature extractor may be considered as a filter. The convolutional layer is a neuron layer that performs convolution processing on an input signal that is in the convolutional neural network. In the convolutional layer of the convolutional neural network, one neuron may be connected to only a part of neurons at a neighboring layer. A convolutional layer generally includes several feature planes, and each feature plane may include some rectanglarly-arranged neurons. Neurons in a same feature plane share a weight, and the shared weight herein is a convolution kernel. Weight sharing may be understood as that a manner of extracting image information is unrelated to a location. The convolution kernel may be initialized in a form of a matrix of a random size. In a training process of the convolutional neural network, an appropriate weight may be obtained for the convolution kernel through learning. In addition, sharing a weight is advantageous because connections between layers of the convolutional neural network are reduced, and a risk of overfitting is reduced.

(4) A recurrent neural network (RNN) is used to process sequence data. In a conventional neural network model, from an input layer to a hidden layer and then to an output layer, the layers are fully connected, but nodes in each layer are not connected. This common neural network resolves many problems, but is still incompetent to resolve many other problems. For example, to predict a next word in a sentence, a previous word usually needs to be used, because adjacent words in the sentence are not independent. A reason why the RNN is referred to as a recurrent neural network is that current output of a sequence is related to previous output. A specific representation is that the network memorizes previous information and applies the previous information to calculation of the current output. To be specific, nodes in the hidden layer are no longer unconnected, but are connected, and input for the hidden layer includes not only output of the input layer but also output of the hidden layer at a previous moment. Theoretically, the RNN can process sequence data of any length. Training of the RNN is the same as training of a conventional CNN or DNN.

A reason why the recurrent neural network is required when there is the convolutional neural network is simple. In the convolutional neural network, there is a premise that elements are independent of each other, and input and output are also independent, such as a cat and a dog. However, many elements are interconnected in the real world. For example, stocks change over time. For another example, a person says: I like traveling, a most favorite place is Yunnan, and I will go there in the future if there is a chance. If there is a blank to be filled herein, people should know that "Yunnan" is to be filled in. This is because people can make an inference from a context, but how can a machine do this? The RNN emerges. The RNN is designed to enable a machine to have a capability to remember like human beings. Therefore, output of the RNN depends on current input information and historical memory information.

(5) Loss Function

In a process of training a deep neural network, because it is expected that an output of the deep neural network is maximally close to an actually predicted value, a current predicted value of the network may be compared with a target value that is expected, and then a weight vector at each layer of the neural network is updated based on a difference between the current predicted value and the target value (there is usually an initialization process before the first update, that is, a parameter is preconfigured for each layer of the deep neural network). For example, if the predicted value of the network is large, the weight vector is adjusted to lower the predicted value until the deep neural network can predict the target value that is actually expected or a value close to the target value that is actually expected. Therefore, "how to obtain, through comparison, the difference between the predicted value and the target value" needs to be predefined. This is the loss function or an objective function. The loss function and the objective function are important equations used to measure the difference between the predicted value and the target value. The loss function is used as an example. A higher output value (loss) of the loss function indicates a larger difference. Therefore, training of the deep neural network is a process of minimizing the loss.

(6) Back Propagation Algorithm

In a training process, a neural network may correct values of parameters in an initial neural network model by using an error back propagation (BP) algorithm, so that a reconstruction error loss of the neural network model becomes increasingly smaller. Specifically, an input signal is forward transferred until an error loss is generated in an output, and the parameters in the initial neural network model are updated based on back propagation error loss information, so that the error loss is reduced. The back propagation algorithm is a back propagation motion mainly dependent on the error loss, and aims to obtain parameters of an optimal neural network model, for example, a weight matrix.

(7) Pixel Value

A pixel value of an image may be a red green blue (RGB) color value, and the pixel value may be a long integer representing a color. For example, a pixel value is 256*Red+100*Green+76Blue, where * represents a multiplication operation, Blue represents a blue component, Green represents a green component, and Red represents a red component. In each color component, a smaller value indicates lower brightness, and a larger value indicates higher brightness. For a grayscale image, a pixel value may be a grayscale value.

As shown in FIG. 1, an embodiment of this application provides a system architecture 100. In FIG. 1, a data collection device 160 is configured to collect training data. For the image enhancement method in the embodiments of this application, the training data may include an original image and a ground truth (GT) corresponding to the original image, and the ground truth corresponding to the original image may be obtained through manual pre-processing.

After collecting the training data, the data collection device 160 stores the training data in the database 130, and the training device 120 obtains the target model/rule 101 through training based on the training data maintained in the database 130.

The following describes the target model/rule 101 obtained by the training device 120 based on the training data. The training device 120 processes an input original image and compares a ground truth corresponding to an output image with a ground truth corresponding to the original image until a difference between a ground truth of an image output by the training device 120 and the ground truth of original image is less than a specific threshold, to complete training the target model/rule 101.

The target model/rule 101 can be used to implement the image enhancement method in the embodiments of this application. To be specific, a to-be-processed image after related preprocessing is input into the target model/rule 101, to obtain an image-enhanced output image. The target model/rule 101 in this embodiment of this application may be specifically an image enhancement apparatus in this embodiment of this application. It should be noted that, in actual application, the training data maintained in the database 130 may not all be collected by the data collection device 160, or may be received or obtained from another device. It should be further noted that the training device 120 may not necessarily train the target model/rule 101 based on the training data maintained in the database 130, or may obtain training data from a cloud or another place to perform model training. The foregoing description should not be construed as a limitation on this embodiment of this application.

The target model/rule 101 obtained through training by the training device 120 may be applied to different systems or devices, for example, applied to an execution device 110 shown in FIG. 1. The execution device 110 may be a terminal, for example, a mobile phone terminal, a tablet computer, a notebook computer, augmented reality (AR)/virtual reality (VR), or an in-vehicle terminal; or may be a server, a cloud device, or the like. In FIG. 1, the execution device 110 is provided with the input/output (I/O) interface 112, and is configured to exchange data with an external device. A user may input data to the I/O interface 112 by using the client device 140. The input data in this embodiment of this application may include a to-be-processed image input by using the client device.

The preprocessing module 113 and the preprocessing module 114 are configured to perform preprocessing based on the input data (for example, the to-be-processed image) received by the I/O interface 112. In this embodiment of this application, the preprocessing module 113 and the preprocessing module 114 may not be included (or only one of the preprocessing modules is included). The calculation module 111 is directly configured to process the input data.

In a process in which the execution device 110 performs preprocessing on the input data or the calculation module 111 of the execution device 110 performs related processing such as calculation, the execution device 110 may invoke data, code, and the like in a data storage system 150 for corresponding processing, and may also store data, instructions, and the like obtained through corresponding processing into the data storage system 150.

Finally, the I/O interface 112 returns a processing result, for example, the obtained image-enhanced output image, to the client device 140, and then provides the processing result to the user.

It should be noted that the training device 120 may generate corresponding target models/rules 101 for different targets or different tasks based on different training data. The corresponding target models/rules 101 may be used to implement the foregoing targets or complete the foregoing tasks, to provide a desired result for the user.

In the case shown in FIG. 1, the user may manually specify input data, and the input data may be manually specified by using an interface provided by the I/O interface 112. In another case, the client device 140 may automatically send input data to the I/O interface 112. If it is required that the client device 140 needs to obtain authorization from the user to automatically send the input data, the user may set corresponding permission on the client device 140. The user may view, on the client device 140, a result output by the execution device 110. Specifically, the result may be presented in a form of displaying, a sound, an action, or the like. The client device 140 may also serve as a data collection end to collect, as new sample data, input data that is input into the I/O interface 112 and an output result that is output from the I/O interface 112 that are shown in the figure, and store the new sample data into the database 130. Certainly, the client device 140 may alternatively not perform collection, but the I/O interface 112 directly stores, as new sample data into the database 130, input data that is input into the I/O interface 112 and an output result that is output from the I/O interface 112 that are shown in the figure.

It should be noted that FIG. 1 is merely a schematic diagram of a system architecture according to an embodiment of this application. A location relationship between the devices, the components, the modules, and the like shown in the figure does not constitute any limitation. For example, in FIG. 1, the data storage system 150 is an external memory relative to the execution device 110, but in another case, the data storage system 150 may alternatively be disposed in the execution device 110.

As shown in FIG. 1, the target model/rule 101 is obtained through training by the training device 120. The target model/rule 101 in this embodiment of this application may be the image enhancement apparatus in this application. Specifically, the image enhancement apparatus provided in this embodiment of this application may include one or more neural networks, and the one or more neural networks may include a CNN, a deep convolutional neural network (DCNN), a recurrent neural network (RNNS), and/or the like.

Because the CNN is a very common neural network, a structure of the CNN is mainly described in detail below with reference to FIG. 2. As described in the foregoing description of basic concepts, the convolutional neural network is a deep neural network with a convolutional structure, and is a deep learning architecture. The deep learning architecture is to perform multi-level learning at different abstract levels according to a machine learning algorithm. As a deep learning architecture, the CNN is a feed-forward artificial neural network, and each neuron in the feed-forward artificial neural network can respond to an image input into the feed-forward artificial neural network.

Figure 2:
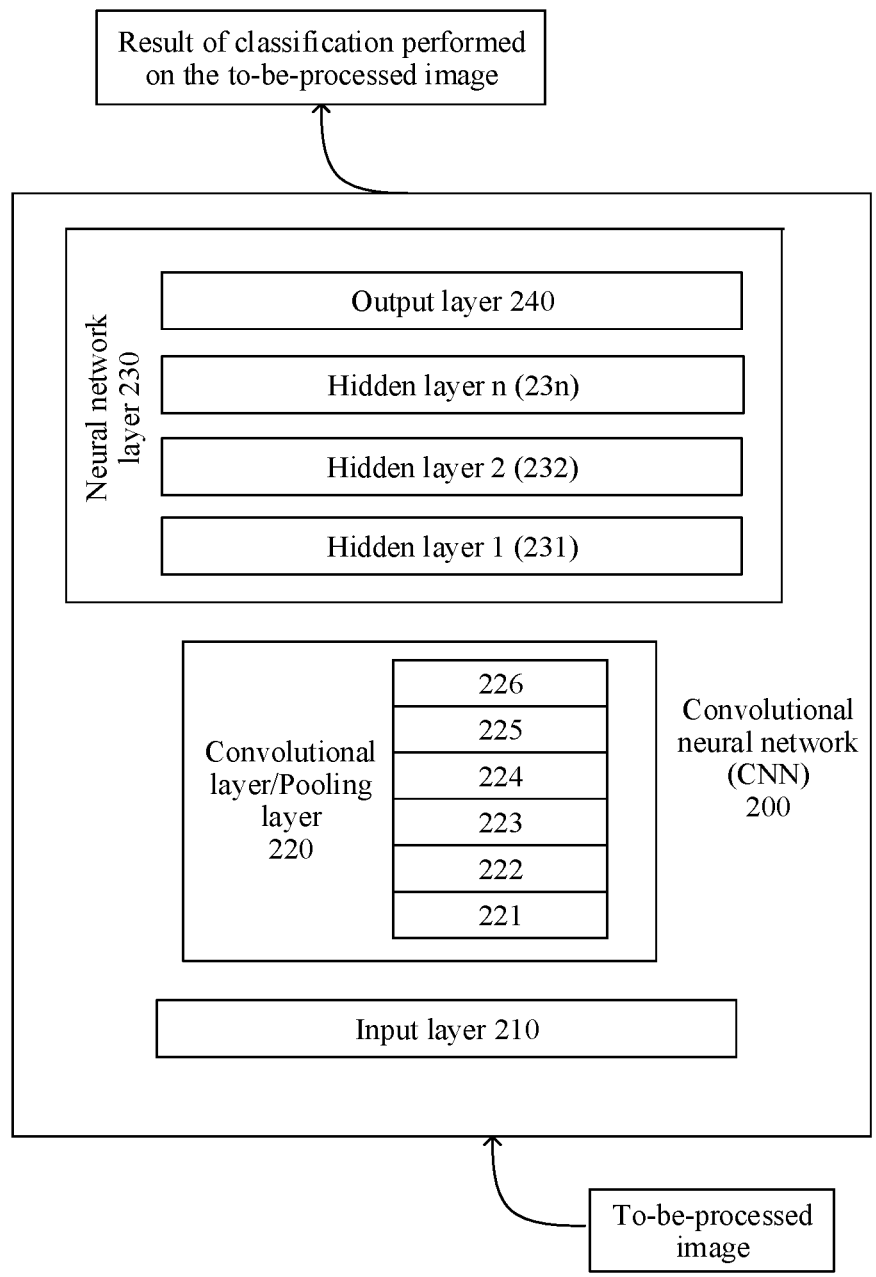
FIG. 2 is a schematic diagram of performing image enhancement based on a convolutional neural network model according to an embodiment of this application.

As shown in FIG. 2, the convolutional neural network (CNN) 200 may include an input layer 210, convolutional layers/pooling layers 220 (where the pooling layer is optional), and a neural network layer 230. The following describes related content of these layers in detail.

Convolutional Layer/Pooling Layer 220:
Convolutional Layer:
As shown in FIG. 2, for example, the convolutional layer/pooling layer 220 may include layers 221 to 226. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layer 221 and the layer 222 are convolutional layers, the layer 223 are a pooling layer, the layer 224 and the layer 225 are convolutional layers, and the layer 226 is a pooling layer. In other words, an output of a convolutional layer may be used as an input for a subsequent pooling layer, or may be used as an input for another convolutional layer, to continue to perform a convolution operation.

The following describes internal working principles of the convolutional layer by using the convolutional layer 221 as an example.

The convolutional layer 221 may include a plurality of convolution operators. The convolution operator is also referred to as a kernel. In image processing, the convolution operator functions as a filter that extracts specific information from an input image matrix. The convolution operator may essentially be a weight matrix, and the weight matrix is usually predefined. In a process of performing a convolution operation on an image, the weight matrix usually processes pixels at a granularity level of one pixel (or two pixels, depending on a value of a stride) in a horizontal direction on an input image, to extract a specific feature from the image. A size of the weight matrix should be related to a size of the image. It should be noted that a depth dimension of the weight matrix is the same as a depth dimension of the input image. During a convolution operation, the weight matrix extends to an entire depth of the input image. Therefore, a convolutional output of a single depth dimension is generated through convolution with a single weight matrix. However, in most cases, a single weight matrix is not used, but a plurality of weight matrices with a same size (rows× columns), that is, a plurality of same-type matrices, are applied. Outputs of the weight matrices are stacked to form a depth dimension of a convolutional picture. The dimension herein may be understood as being determined based on the foregoing "plurality". Different weight matrices may be used to extract different features from the image. For example, one weight matrix is used to extract edge information of the image, another weight matrix is used to extract a specific color of the image, and a further weight matrix is used to blur unneeded noise in the image. Sizes of the plurality of weight matrices (rows×columns) are the same. Sizes of feature maps extracted from the plurality of weight matrices with the same size are also the same, and then the plurality of extracted feature maps with the same size are combined to form an output of the convolution operation.

Weight values in these weight matrices need to be obtained through a lot of training during actual application. Each weight matrix formed by using the weight values obtained through training may be used to extract information from an input image, to enable the convolutional neural network 200 to perform correct prediction.

When the convolutional neural network 200 has a plurality of convolutional layers, an initial convolutional layer (for example, the layer 221) usually extracts more general features, where the general features may also be referred to as lower-level features. As a depth of the convolutional neural network 200 increases, a deeper convolutional layer (for example, the layer 226) extracts more complex features, such as higher-level semantic features. Higher-level semantic features are more applicable to a problem to be resolved.

Pooling Layer/Pooling Layer 220:
A quantity of training parameters often needs to be reduced. Therefore, a pooling layer often needs to be periodically introduced after a convolutional layer. For the layers 221 to 226 shown in the convolutional layers/pooling layers 220 in FIG. 2, one convolutional layer may be followed by one pooling layer, or a plurality of convolutional layers may be followed by one or more pooling layers. During image processing, the pooling layer is only used to reduce a space size of the image. The pooling layer may include an average pooling operator and/or a maximum pooling operator, to perform sampling on the input image to obtain an image with a relatively small size. The average pooling operator may be used to calculate pixel values in the image in a specific range, to generate an average value. The average value is used as an average pooling result. The maximum pooling operator may be used to select a pixel with a maximum value in a specific range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.

Neural Network Layer 230
After processing is performed by the convolutional layers/pooling layers 220, the convolutional neural network 200 still cannot output required output information. As described above, at the convolutional layer/pooling layer 220, only a feature is extracted, and parameters resulting from an input image are reduced. However, to generate final output information (required class information or other related information), the convolutional neural network 200 needs to use the neural network layer 230 to generate an output of one required class or outputs of a group of required classes. Therefore, the neural network layer 230 may include a plurality of hidden layers (hidden layers 231, 232, . . . , and 23n shown in FIG. 2) and an output layer 240. Parameters included in the plurality of hidden layers may be obtained through pre-training based on related training data of a specific task type. For example, the task type may include image recognition, image classification, and super-resolution image reconstruction.

At the neural network layer 230, the plurality of hidden layers are followed by the output layer 240, namely, the last layer of the entire convolutional neural network 200. The output layer 240 has a loss function similar to a categorical cross entropy, and the loss function is specifically used to calculate a prediction error. Once forward propagation (propagation in a direction from the input layer 210 to the output layer 240, as shown in FIG. 2) of the entire convolutional neural network 200 is completed, reverse propagation (propagation in a direction from the output layer 240 to the input layer 210, as shown in FIG. 2) is started to update a weight value and a deviation of each layer mentioned above, to reduce a loss of the convolutional neural network 200 and an error between a result output by the convolutional neural network 200 by using the output layer and an ideal result.

It should be noted that the convolutional neural network 200 shown in FIG. 2 is merely an example convolutional neural network. In specific application, the convolutional neural network may alternatively exist in a form of another network model.

In this application, the image enhancement apparatus may include the convolutional neural network 200 shown in FIG. 2, and the image enhancement apparatus may perform image enhancement processing on a to-be-processed image, to obtain an image-enhanced output image.

Figure 3:
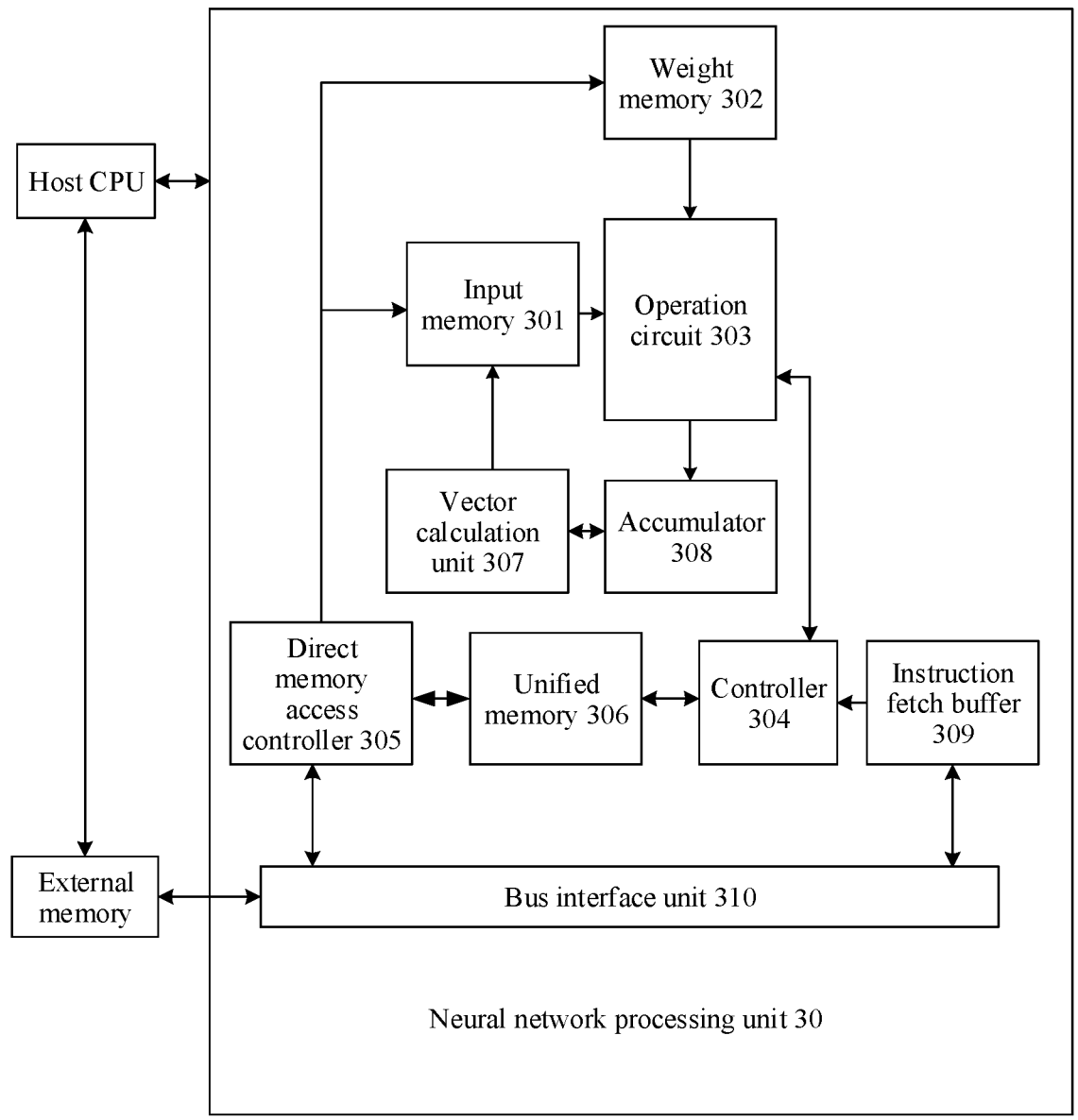
FIG. 3 is a schematic diagram of a hardware structure of a chip according to an embodiment of this application.

FIG. 3 shows a hardware structure of a chip according to an embodiment of this application, and the chip includes a neural network processing unit 50. The chip may be disposed in the execution device 110 shown in FIG. 1, to complete computation work of the calculation module 111. The chip may alternatively be disposed in the training device 120 shown in FIG. 1, to complete training work of the training device 120 and output the target model/rule 101. All algorithms of the layers in the convolutional neural network shown in FIG. 2 may be implemented in the chip shown in FIG. 3.

The neural network processing unit NPU 50 is mounted to a host CPU as a coprocessor, and the host CPU allocates a task to the NPU 50. A core part of the NPU is an operation circuit 503, and a controller 504 controls the operation circuit 503 to extract data from a memory (a weight memory or an input memory) and perform an operation.

In some implementations, the operation circuit 503 includes a plurality of processing engines (PEs). In some implementations, the operation circuit 503 is a two-dimensional systolic array. The operation circuit 503 may alternatively be a one-dimensional systolic array or another electronic circuit capable of performing mathematical operations such as multiplication and addition. In some implementations, the operation circuit 503 is a general-purpose matrix processor.

For example, it is assumed that there are an input matrix A, a weight matrix B, and an output matrix C. The operation circuit 503 fetches data corresponding to the matrix B from the weight memory 502 and buffers the data in each PE of the operation circuit 503. The operation circuit 503 fetches data of the matrix A from an input memory 501, to perform a matrix operation on the matrix B, and stores an obtained partial result or an obtained final result of the matrix into an accumulator 508.

A vector calculation unit 507 may perform further processing such as vector multiplication, vector addition, an exponent operation, a logarithm operation, or value comparison on an output of the operation circuit 503. For example, the vector calculation unit 507 may be configured to perform network calculation, such as pooling, batch normalization, or local response normalization at a non-convolutional/non-FC layer in a neural network.

In some implementations, the vector calculation unit 507 can store a processed output vector in a unified buffer 506. For example, the vector calculation unit 507 can apply a non-linear function to an output of the operation circuit 503, for example, a vector of an accumulated value, used to generate an activated value. In some implementations, the vector calculation unit 507 generates a normalized value, a combined value, or both. In some implementations, the processed output vector can be used as activation input for the operation circuit 503, for example, the processed output vector is used in a subsequent layer in the neural network.

The unified memory 506 is configured to store input data and output data.

For weight data, a direct memory access controller (DMAC) 505 directly transfers input data in an external memory to the input memory 501 and/or the unified memory 506, stores weight data in the external memory in the weight memory 502, and stores data in the unified memory 506 in the external memory.

A bus interface unit (BIU) 510 is configured to implement interaction between the host CPU, the DMAC, and an instruction fetch buffer 509 through a bus.

an instruction fetch buffer 509 connected to the controller 504, configured to store an instruction used by the controller 504; and The controller 504 is configured to invoke the instructions cached in the instruction fetch buffer 509, to control a working process of an operation accelerator.

Usually, the unified memory 506, the input memory 501, the weight memory 502, and the instruction fetch buffer 509 each are an on-chip memory. The external memory is a memory outside the NPU. The external memory may be a double data rate synchronous dynamic random access memory (DDR SDRAM), a high bandwidth memory (HBM), or another readable and writable memory.

Operations of the layers in the convolutional neural network shown in FIG. 2 may be performed by the operation circuit 503 or the vector calculation unit 307.

The execution device 110 in FIG. 1 described above can execute steps of the image enhancement method in the embodiments of this application, and the CNN model shown in FIG. 2 and the chip shown in FIG. 3 may also be used to execute the steps of the image enhancement method in the embodiments of this application. The following describes in detail the image enhancement method in the embodiments of this application with reference to the drawings.

Figure 4:
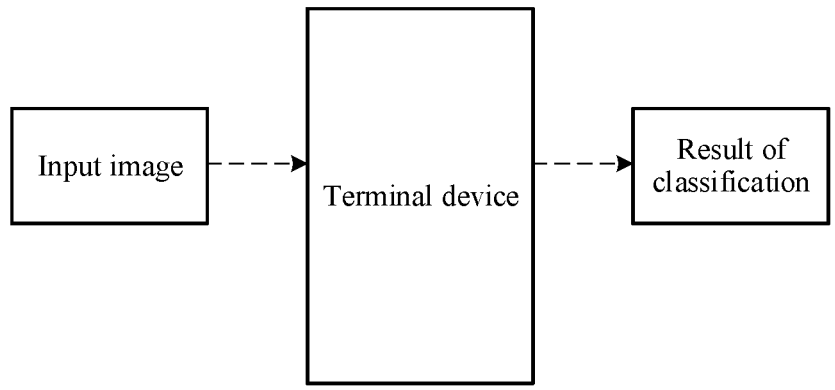
FIG. 4 is a schematic diagram of an application scenario according to an embodiment of this application.

The image enhancement method provided in the embodiments of this application may be performed on a server, may be performed on a cloud, or may be performed on a terminal device. Using terminal device as an example, as shown in FIG. 4, the technical solutions of the embodiments of the present application may be applied to the terminal device, and in the image enhancement method in the embodiments of this application, image enhancement may be performed on an input image, to obtain an image-enhanced output image of the input image. The terminal device may be mobile or fixed. For example, the terminal device may be a mobile phone, a tablet personal computer (TPC), a media player, a smart television, a laptop computer (LC), a personal digital assistant (PDA), a personal computer (PC), a camera, a video camera, a smart watch, a wearable device (WD), or a self-driving car that has an image enhancement function. This is not limited in the embodiments of the present application.

In the conventional technology, limited by computing power and power consumption of terminal device, a to-be-processed image is usually downsampled, to obtain a low-resolution image, and then image quality enhancement is performed on the low-resolution image. However, it is difficult to obtain accurate local detail information from the low-resolution image, which affects an effect of image quality enhancement processing.

An embodiment of this application provides an image enhancement method. A plurality of images having different pixel values are obtained by adjusting a pixel value of a to-be-processed image, and image quality enhancement processing is performed by using the plurality of images having different pixel values, so that more local detail information can be obtained from the plurality of images having different pixel values. Therefore, the method can improve the effect of image quality enhancement processing.

It should be noted that image quality enhancement can also be referred to as image enhancement, and can specifically refer to processing brightness, color, contrast, saturation and/or dynamic range of an image, so that all indexes of the image meet preset conditions. In this embodiment of this application, image enhancement and image quality enhancement have the same meaning.

Figure 5:
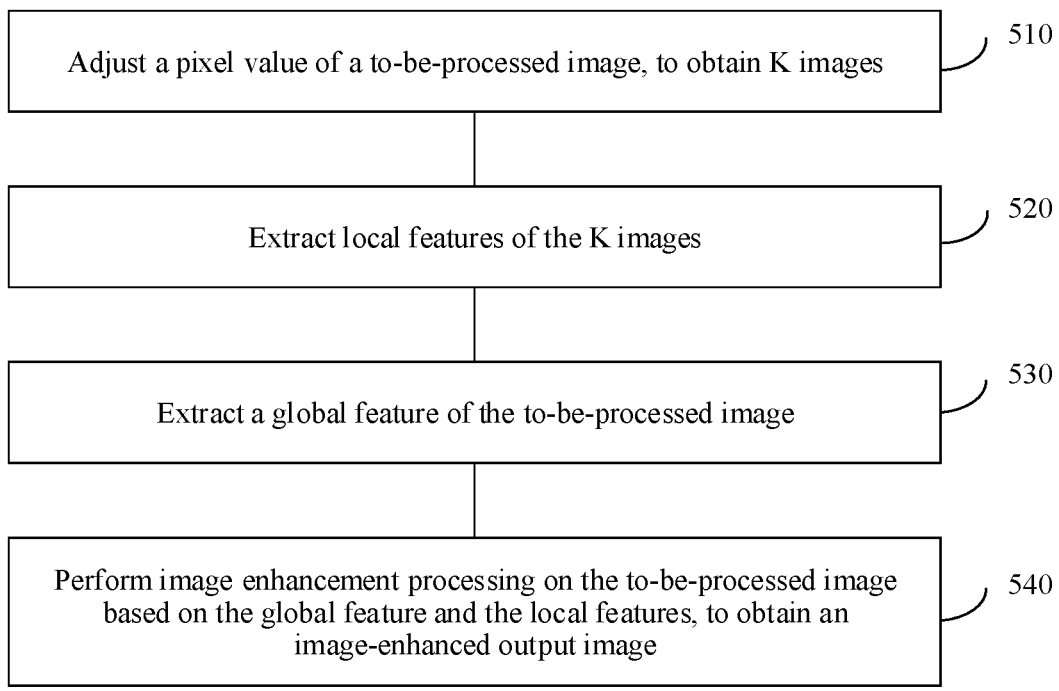
FIG. 5 is a schematic flowchart of an image enhancement method according to an embodiment of this application.

FIG. 5 shows a schematic flowchart of the image enhancement method 500 provided in this embodiment of this application. The method can be performed by an apparatus or a device capable of performing image enhancement, for example, the method can be performed by the terminal device in FIG. 4.

S510: Adjust a pixel value of a to-be-processed image, to obtain K images.

Pixel values of the K images are different, and K is a positive integer greater than 1.

It should be understood that different pixel values of the K images herein may mean that all pixel values of the K images are different, or some pixel values of the K images are different.

In addition, the K images are obtained by adjusting the pixel value of the to-be-processed image, to ensure that picture contents of the K images participating in the image enhancement processing are consistent and have no pixel offset, so that a ghost image caused by inconsistent picture contents or a pixel offset can be avoided.

Optionally, the K images can be obtained by adjusting the pixel value of the to-be-processed image for K times. In this case, the K images are all obtained by adjusting the pixel value of the to-be-processed image, that is, the K images do not include the to-be-processed image.

Alternatively, K−1 images can be obtained by adjusting the pixel value of the to-be-processed image for K−1 times, and the K images can be obtained based on the K−1 images and the to-be-processed image. In this case, the K images include the to-be-processed image, and the K−1 images other than the to-be-processed image in the K images are obtained by adjusting the pixel value of the to-be-processed image.

Optionally, the adjusting a pixel value of a to-be-processed image, to obtain K images may include: increasing and/or decreasing all pixel values of the to-be-processed image through non-linear transformation, to obtain the K images.

In this embodiment of this application, the K images can be conveniently obtained by increasing and/or decreasing all the pixel values of the to-be-processed image through the non-linear transformation, so that more local detail information can be obtained from the K images.

The non-linear transformation in S510 may be gamma transformation (or γ transformation), or may be another non-linear transformation method capable of adjusting a pixel value of an image. This is not limited in this embodiment of this application.

Usually, the gamma transformation may also be referred to as gamma correction or gamma non-linearization, and is a method for performing non-linear transformation on an image.

The gamma transformation may be implemented through the following formula:

$$V_{out} = A * V_{in}^{\gamma}$$

$V_{in}$ is an input image pixel, $V_{out}$ is an output image pixel, A is a gain, and γ is the power of non-linearization.

$V_{in}$ may be an input image pixel after normalization, that is, a value range of $V_{in}$ is [0,1]. In a case in which normalization is performed on $V_{in}$, when γ<1, a value of the input image pixel can be increased, and in this case, it can be considered that $V_{out}$ is an overexposed image relative to $V_{in}$; and when γ>1, the value of the input image pixel can be decreased, and in this case, it can be considered that $V_{out}$ is an underexposed image relative to $V_{in}$.

In this application, the pixel value of the to-be-processed image may be adjusted through the gamma transformation.

For example, the to-be-processed image may be $V_{in}$ in the foregoing formula, and one of the K images can be obtained by performing gamma transformation once, and the K images can be obtained by performing gamma transformation for K times. In this case, the K images are all obtained through gamma transformation, and the K images do not include the to-be-processed image.

Alternatively, K−1 images can be obtained by performing gamma transformation for K−1 times, and the K images can be obtained based on the K−1 images and the to-be-processed image. In this case, the K images include the to-be-processed image, and the K−1 images other than the to-be-processed image in the K images are obtained through gamma transformation.

In this embodiment of this application, during overexposing processing (that is, when the pixel value of the to-be-processed image is increased through gamma transformation), γ in the above formula may be expressed as $\gamma_{high\text{-}exop}$, and during underexposing processing (that is, when the pixel value of the to-be-processed image is decreased through gamma transformation), γ in the above formula may be expressed as $\gamma_{loc\text{-}exop}$, and $\gamma_{high\text{-}exop}$ and $\gamma_{low\text{-}exop}$ can be determined through the following formulas:

$$\gamma_{high\text{-}exop} = \begin{cases} a & \text{if } g \leq a \\ b & \text{if } g \geq b \end{cases}$$

$$g = \sqrt{L_{avg} * \frac{1 + p(L \geq L_{high})}{1 + p(L \leq L_{low})}}$$

$$\gamma_{low\text{-}exop} = \frac{1}{\gamma_{high\text{-}exop}} \quad 0 < a < b < 1$$

$L_{avg}$ an average brightness value of all pixels in the to-be-processed image, $L_{high}$ is a high threshold value of brightness, $L_{low}$ is a low threshold value of brightness, $0 < L_{low} < L_{high} < 1$, $p(L \geq L_{high})$ indicates a proportion of pixels whose brightness values are greater than $L_{high}$ in all the pixels in the to-be-processed image, $p(L \leq L_{low})$ indicates a proportion of pixels whose brightness values are less than $L_{low}$ in all the pixels in the to-be-processed image, a is a low threshold of γ during overexposing processing, b is a high threshold of γ during overexposing processing, and a, b, $L_{high}$, and $L_{low}$ are all hyper-parameters.

In this application, when the method shown in FIG. 5 is performed by the terminal device in FIG. 4, the to-be-processed image may be an image captured by the terminal device through a camera, or the to-be-processed image may be an image obtained from the inside of the terminal device (for example, an image stored in an album of the terminal device or an image obtained from a cloud by the terminal device). This is not limited in this embodiment of this application.

Alternatively, in this embodiment of this application, to reduce a calculation amount, a to-be-enhanced image (namely, an original image of the to-be-processed image) may be downsampled first to obtain a low-resolution image, and then a feature of the low-resolution image is extracted. In this way, a calculation amount of image enhancement processing is reduced.

Figure 6:
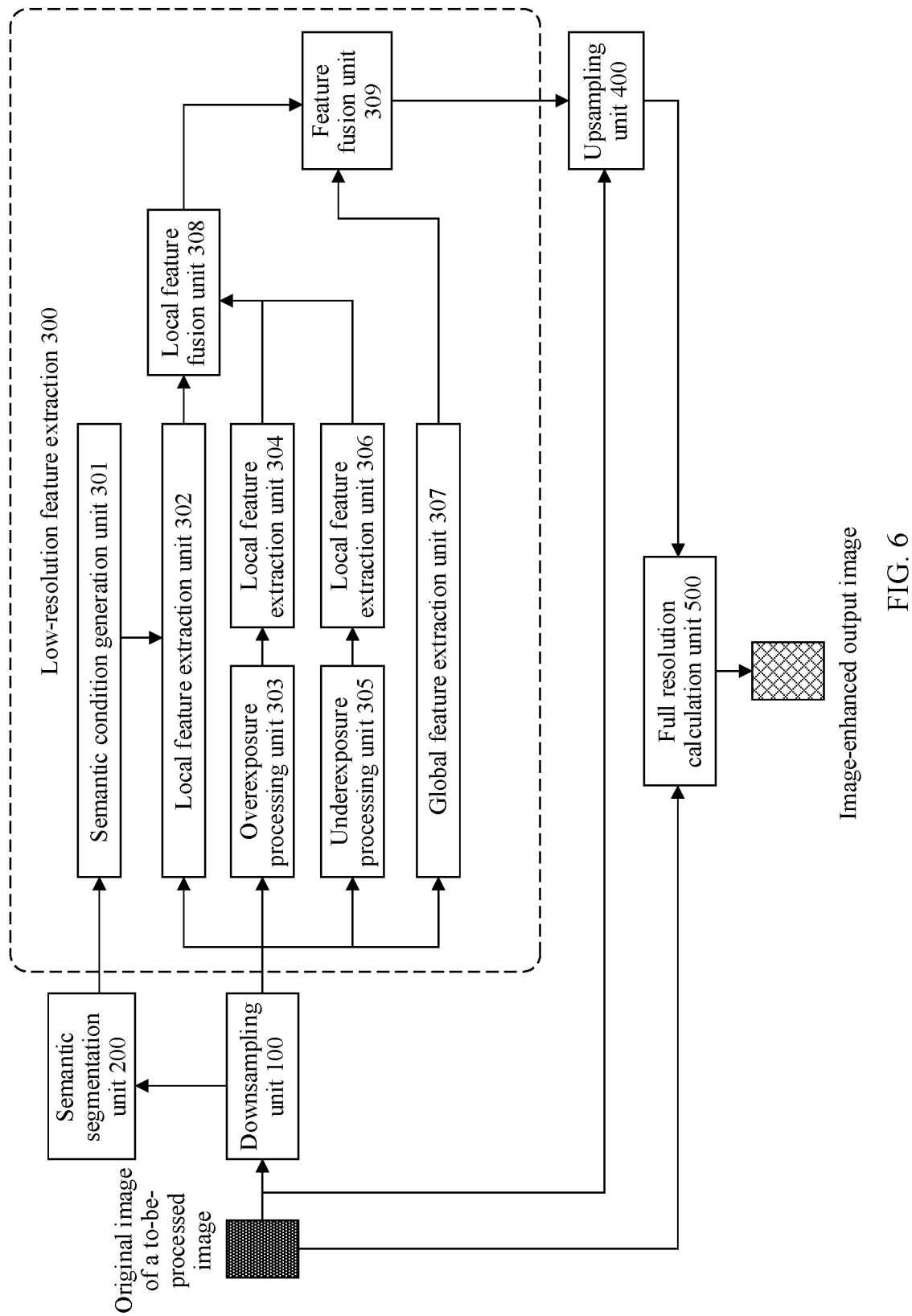
FIG. 6 is a schematic block diagram of an image enhancement apparatus according to an embodiment of this application.

FIG. 6 is a possible implementation of this embodiment of this application. For example, as shown in FIG. 6, the to-be-processed image may be an image obtained after the original image of the to-be-processed image is processed by a downsampling unit 100 in FIG. 6.

In this case, the original image of the to-be-processed image may be an image captured by the terminal device through the camera, or the original image of the to-be-processed image may be an image obtained from the inside of the terminal device, and the to-be-processed image may be an image (low-resolution image) obtained after the original image of the to-be-processed image is downsampled.

S520: Extract local features of the K images.

Optionally, a neural network may be used to extract the local features of the K images.

The local features may be features extracted from local regions of the images, and include edges, angular points, lines, curves, and regions with a special attribute.

Because the pixel values of the K images are different, K neural networks may be used to extract the local features of the K images.

Optionally, the K neural networks may correspond to the K images one by one, and the K neural networks are used respectively to extract local features of corresponding images.

For example, as shown in FIG. 6, the to-be-processed image is an image (low resolution image) obtained after the original image of the to-be-processed image is processed by the downsampling unit 100 in FIG. 6. The pixel value of the to-be-processed image is adjusted to obtain three images. The three images include an overexposed image, an underexposed image, and the to-be-processed image. A local feature extraction unit 302 in FIG. 6 corresponds to the to-be-processed image and is configured to extract a local feature of the to-be-processed image. A local feature extraction unit 304 in FIG. 6 corresponds to the overexposed image and is configured to extract a local feature of the overexposed image. A local feature extraction unit 306 in FIG. 6 corresponds to the underexposed image and is configured to extract a local feature of the underexposed image.

For details of the method for downsampling the original image of the to-be-processed image to obtain the to-be-processed image, refer to the conventional technology, and the details are not repeated in this embodiment of this application.

Optionally, the local feature extraction unit 302, the local feature extraction unit 304, and the local feature extraction unit 306 that are in FIG. 6 may be implemented by using three neural networks.

Figure 7:
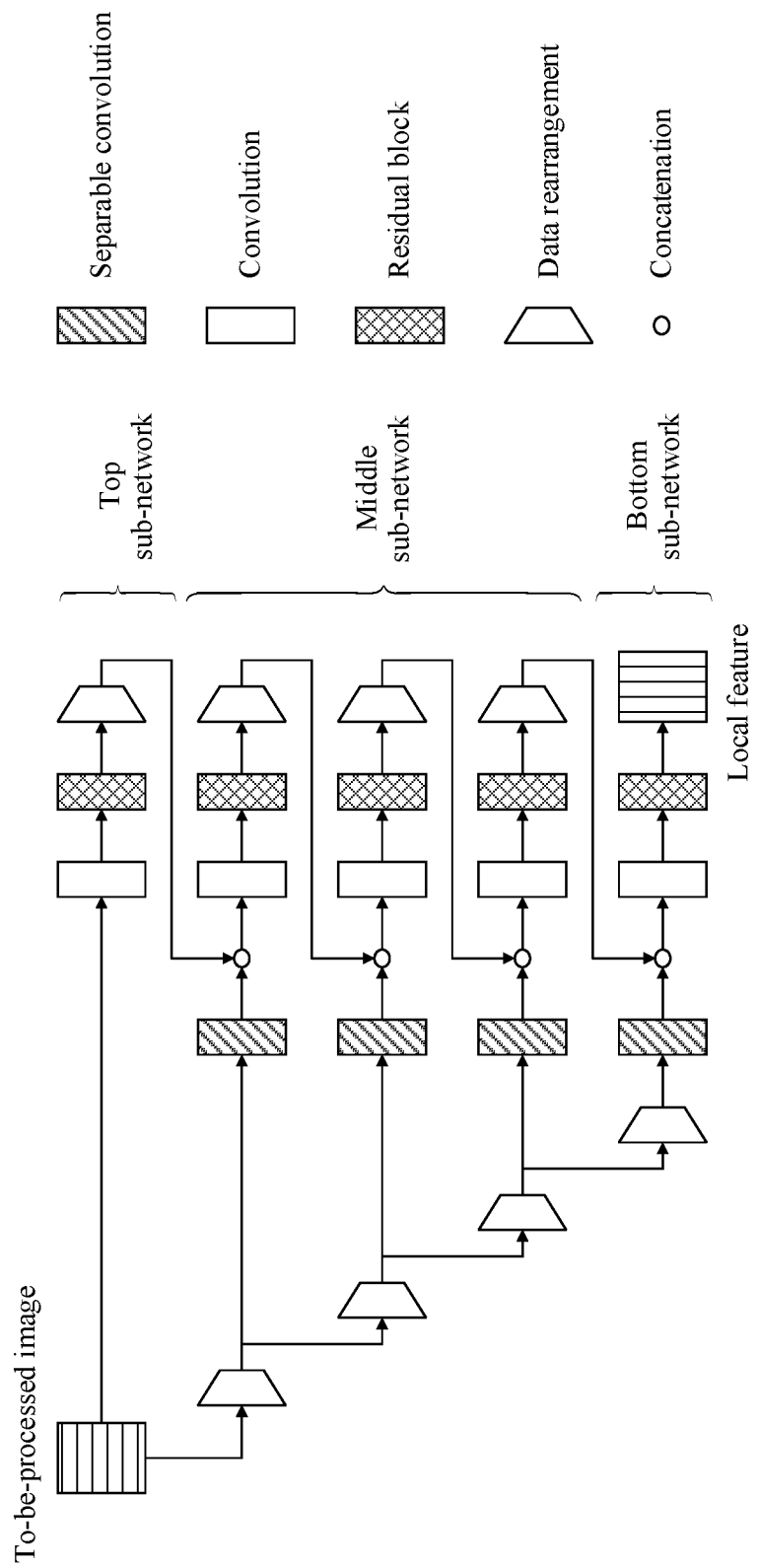
FIG. 7 is a schematic block diagram of a local feature extraction method according to an embodiment of this application.

For example, one or more of the local feature extraction unit 302, the local feature extraction unit 304, and the local feature extraction unit 306 that are in FIG. 6 may be implemented by using a multi-scale self-learning network structure shown in FIG. 7, or may be implemented by using other neural networks. This is not limited in this embodiment of this application.

The multi-scale self-learning network structure in FIG. 7 includes a plurality of modules including a top sub-network, a middle sub-network, and a bottom sub-network. The top sub-network is an original feature extraction layer, the middle sub-network is a different middle feature extraction layer, and the bottom sub-network is a final feature extraction layer, and downsampling is performed by using a space2depth (or may be denoted as space to depth) operation. For detailed description of the network structure, refer to a related application (the application title is IMAGE DENOISING METHOD AND APPARATUS, and the application number is Chinese Patent Application No. 201910156951.0, filed on Mar. 1, 2019). Details are not described in this embodiment of this application.

It should be noted that the multi-scale self-learning network structure in this application is optimized on the basis of the foregoing related application. As shown in FIG. 7, after the space2depth operation is performed on the to-be-processed image, separable convolution may be used instead of ordinary convolution, so that a convolution depth and a convolution receptive field are increased without excessively increasing the calculation amount, thereby implementing more accurate feature extraction. Certainly, in this application, feature extraction may also be performed by using a network structure in the foregoing related application. This is not limited in this embodiment of this application.

In this embodiment of this application, semantic segmentation may also be performed on the to-be-processed image, to obtain a semantic segmentation graph; and feature extraction is performed on the semantic segmentation graph, to obtain a semantic condition. The semantic condition may include semantic information of the to-be-processed image.

The semantic segmentation in this embodiment of this application may also be referred to as image semantic segmentation, which refers to a process of dividing pixels in an image into different regions according to a specific rule (for example, illumination or types). A result of the semantic segmentation performed on the image is the semantic segmentation graph.

Alternatively, the image may be divided into different regions at a pixel level based on types, for example, different regions in the image may be distinguished by using different colors.

For example, a region in which a building is located in the image may be marked as blue, a region in which the sky is located in the image is marked as green, and a region in which a plant is located in the image is marked as yellow based on types. An image in which different types of regions in the image are marked by using different colors may be referred to as a semantic segmentation graph.

Information that is carried in the semantic segmentation graph and that may be used to indicate different types of regions (for example, a building, a plant, and the sky) in the image may be referred to as semantic information (or semantic information of the image). Likewise, the semantic segmentation graph may also include semantic information for indicating other information (for example, division of different illumination in the image into different types) in the image. This is not limited in this embodiment of this application.

In this embodiment of this application, the semantic condition may include the semantic information of the to-be-processed image, and the semantic information may be used to indicate information such as different types of regions or illumination in the to-be-processed image. Alternatively, the semantic information may be used to indicate other information in the to-be-processed image. This is not limited in this embodiment of this application.

For details of the method for performing semantic segmentation on the to-be-processed image to obtain the semantic segmentation graph, refer to the conventional technology, and details are not repeated in this embodiment of this application.

Optionally, a neural network may be used to perform feature extraction on the semantic segmentation graph, to obtain the semantic condition. For example, as shown in FIG. 6, feature extraction may be performed on the semantic segmentation graph by using a semantic condition generation unit 301, to obtain the semantic condition. The semantic condition generation unit 301 may be implemented by using a neural network.

In this application, the extracting local features of the K images may include: extracting local features of one or more of the K images based on the semantic condition.

In other words, at least one of the local features of the K images may be extracted based on the semantic condition.

In this embodiment of this application, feature extraction is performed on the semantic segmentation graph, to obtain the semantic condition, and the local features of one or more of the K images are extracted based on the semantic condition, so that a semantic difference between different local regions can be better reflected in an image-enhanced image.

For example, as shown in FIG. 6, the pixel value of the to-be-processed image is adjusted to obtain three images, and the three images include an overexposed image, an underexposed image, and the to-be-processed image. In this case, the local feature of the to-be-processed image in the three images can be extracted based on the semantic condition that is obtained by the semantic condition generation unit 301; a local feature of the overexposed image or the underexposed image in the three images can be extracted based on the semantic condition; or local features of a plurality of images in the three images can be extracted based on the semantic conditions, for example, local features of the overexposed image and the underexposed image can be extracted based on the semantic condition. This is not limited in this embodiment of this application.

Figure 8:
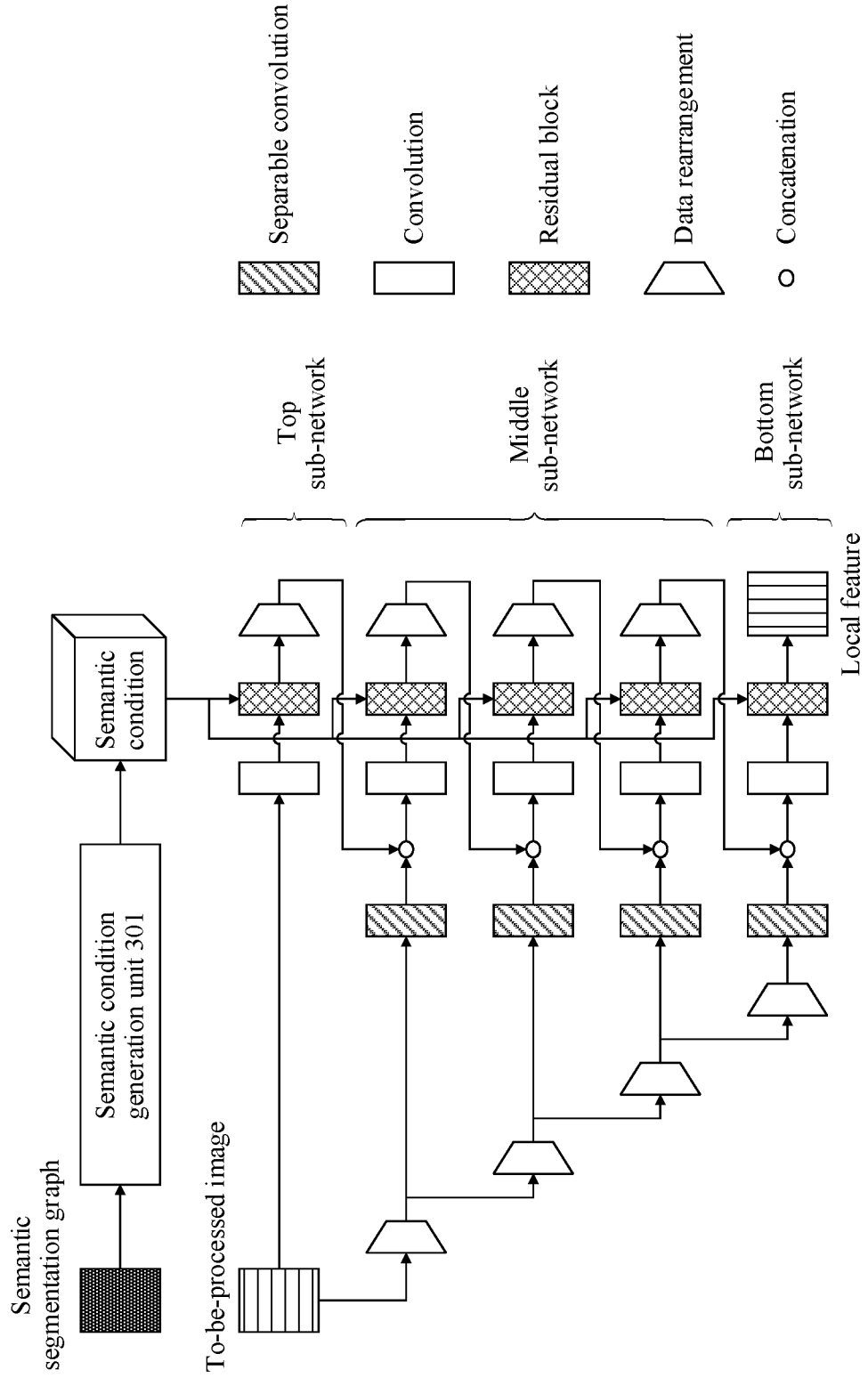
FIG. 8 is a schematic block diagram of a local feature extraction method according to another embodiment of this application.

For example, when feature extraction is performed on one or more of the K images by using the network structure shown in FIG. 7, as shown in FIG. 8, the semantic condition may be input into each residual block (residual convolution block), and a residual estimated value is determined based on the semantic condition; and local features of one or more of the K images are determined based on the residual estimated value.

Figure 9:
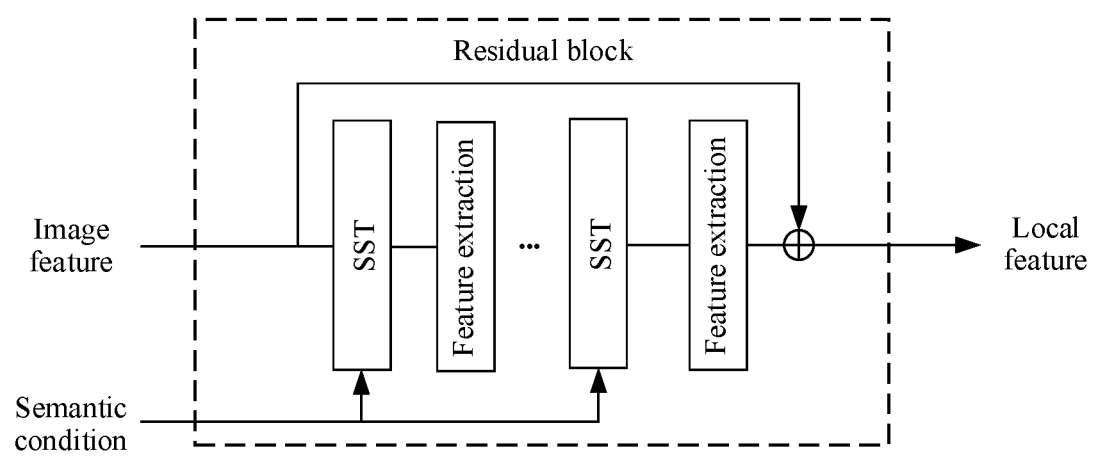
FIG. 9 is a schematic block diagram of a residual block according to an embodiment of this application.

A structure of the residual block in FIG. 8 may be shown in FIG. 9. It can be learned that the residual block in this embodiment of this application may include one or more convolutional layers, and a front part of each convolutional layer in the residual block may include one semantic spatial transform (SST) layer. A specific implementation of SST layer may be shown in FIG. 10.

It should be understood that the embodiments shown in FIG. 8 and FIG. 9 are merely examples but not limitations. In this application, when feature extraction is performed by using another network, the local features of one or more of the K images may be extracted based on the semantic condition.

Optionally, that the local features of one or more of the K images are extracted based on the semantic condition may include: determining a first semantic feature and a second semantic feature based on the semantic condition; and extracting the local feature of one of the K images based on the first semantic feature and the second semantic feature.

In other words, at least one of the local features of the K images is extracted based on the first semantic feature and the second semantic feature, where the first semantic feature and the second semantic feature are determined based on the semantic condition.

Further, the extracting the local feature of one of the K images based on the first semantic feature and the second semantic feature may include: determining the residual estimated value based on the first semantic feature, the second semantic feature, and an image feature of the to-be-processed image; and determining the local feature of one of the K images based on the residual estimated value.

That is, at least one of the local features of the K images may be determined based on the residual estimated value, where the residual estimated value is determined based on the first semantic feature, the second semantic feature, and the image feature of the to-be-processed image.

It should be noted that the extraction of the local feature of one of the K images does not mean that the local feature of only one of the K images is extracted, but means that the local feature of each image in the K images is extracted. The first semantic feature and the second semantic feature that correspond to the image and that are determined based on the semantic condition may be different.

Figure 10:
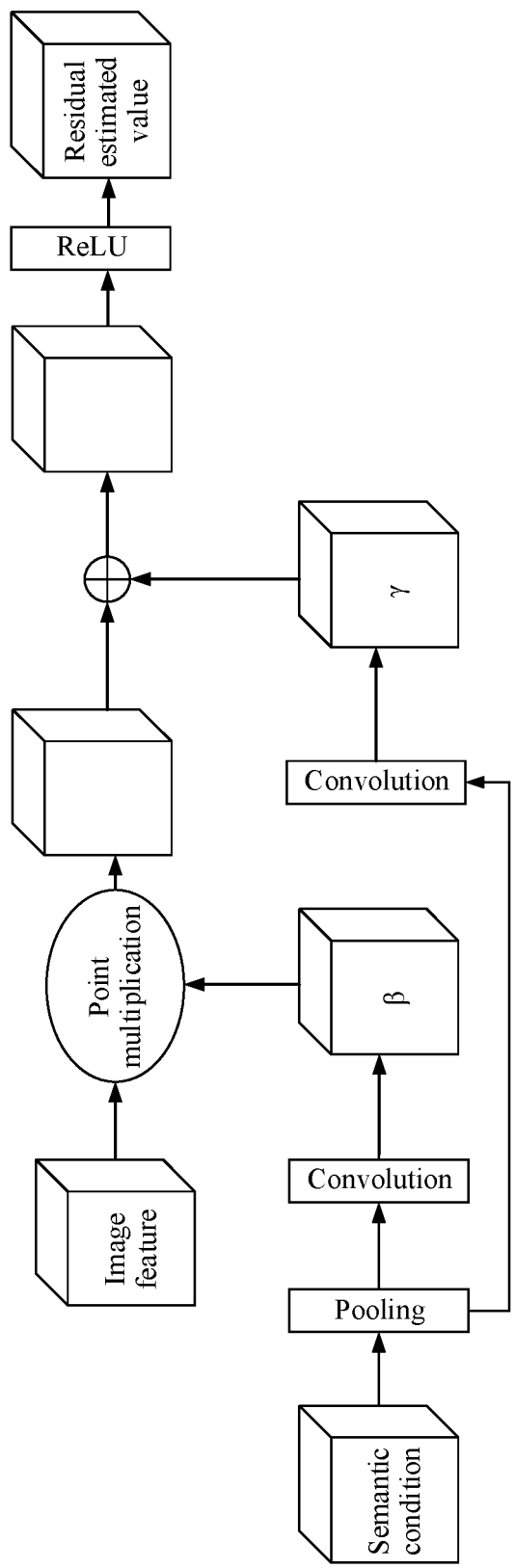
FIG. 10 is a schematic block diagram of semantic space conversion according to an embodiment of this application.

For example, the semantic spatial transform (SST) model shown in FIG. 10 may be used to determine the first semantic feature (namely, β in FIG. 10) and the second semantic feature (namely, γ in FIG. 10) that correspond to one of the K images, and the residual estimated value is determined based on the first semantic feature, the second semantic feature, and the image feature of the to-be-processed image.

The SST model in FIG. 10 can be represented by the following formula:

$$SST = \text{Re LU}((\beta \cdot F) + \gamma)$$

SST is a result of semantic spatial transformation, ReLU is a rectified linear unit ReLU, β is the first semantic feature, γ is the second semantic feature, F is the image feature of the to-be-processed image, and "·" is a point multiplication operation.

After the result of the semantic spatial transformation is obtained, as shown in FIG. 9, convolution may be performed on the result of the semantic spatial transformation, and then a convolution result is added to the image feature of the to-be-processed image, to obtain the residual estimated value.

It should be noted that the residual block shown in FIG. 9 may include one or more SST models and one or more convolution layers. In other words, in this embodiment of this application, after SST and convolution are performed for one or more times, the convolution result may be added to the image feature of the to-be-processed image, to obtain the residual estimated value. A quantity of times of performing SST and convolution is not limited in this embodiment of this application.

After the local features of the K images are extracted, feature fusion may be performed on the local features of the K images, to obtain a local fusion feature after fusion.

For example, as shown in FIG. 6, feature fusion may be performed on the local feature of the overexposed image, the local feature of the underexposed image, and the local feature of the to-be-processed image by using a local feature fusion unit 308. A structure of the local feature fusion unit 308 may be shown in FIG. 11.

Figure 11:
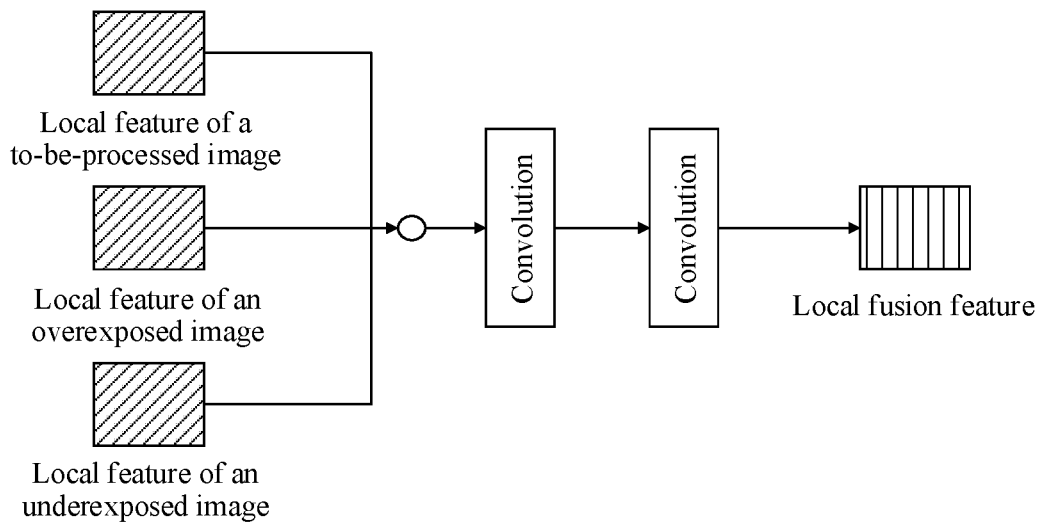
FIG. 11 is a schematic block diagram of local feature fusion according to an embodiment of this application.

Specifically, in FIG. 11, concatenation and convolution may be performed on the local feature of the overexposed image, the local feature of the underexposed image, and the local feature of the to-be-processed image, to obtain the local fusion feature after fusion.

It should be understood that the structure shown in FIG. 11 is merely an example and is not construed as a limitation, and the local feature fusion unit 308 may include more or fewer convolutional layers, and may also include a pooling layer, a full connection (FC) layer, or another layer in a neural network. This is not limited in this embodiment of this application.

S530: Extract a global feature of the to-be-processed image.

Optionally, a neural network may be used to extract the global feature of the to-be-processed image. For example, the neural network may be a pre-trained convolutional neural network.

The global feature may refer to an overall attribute of the image, and includes a color feature, a texture feature, a shape feature, a histogram, or the like.

It should be noted that an execution sequence of S520 and S530 is not limited in this embodiment of this application. For example, S520 may be performed before S530; S530 may be performed before S520; or S520 and S530 may be performed simultaneously. This is not limited in this application.

S540: Perform image enhancement processing on the to-be-processed image based on the global feature and the local features, to obtain an image-enhanced output image.

In this application, when feature fusion is performed on the local features of the K images to obtain a local fusion feature, the performing image enhancement processing on the to-be-processed image based on the global feature and the local features, to obtain an image-enhanced output image may include: performing image enhancement processing on the to-be-processed image based on the global feature and the local fusion feature, to obtain the image-enhanced output image.

Optionally, the performing image enhancement processing on the to-be-processed image based on the global feature and the local features, to obtain an image-enhanced output image may include: performing feature fusion on the global feature and the local features, to obtain a fusion feature; and performing image enhancement processing on the to-be-processed image based on the fusion feature, to obtain the image-enhanced output image.

In this embodiment of this application, the fusion feature is obtained by performing feature fusion on the global feature and the local features, rather than simply adding the global feature to the local features. Therefore, a local region of the image-enhanced image can be prevented from having a same global feature, so that the effect of image enhancement processing can be improved.

Optionally, the feature fusion may be performed on the global feature and the local features by using a neural network, to obtain the fusion feature.

Optionally, in this application, the feature fusion may be performed on the global feature and the local features in the following two manners to obtain the fused feature:

Manner 1:

Optionally, feature extraction may be performed on the global feature, to obtain a first global feature and a second global feature; addition may be performed on the first global feature and the local features, to obtain a candidate fusion feature; and concatenation and convolution may be performed on the candidate fusion feature and the second global feature, to obtain the fusion feature.

Figure 12:
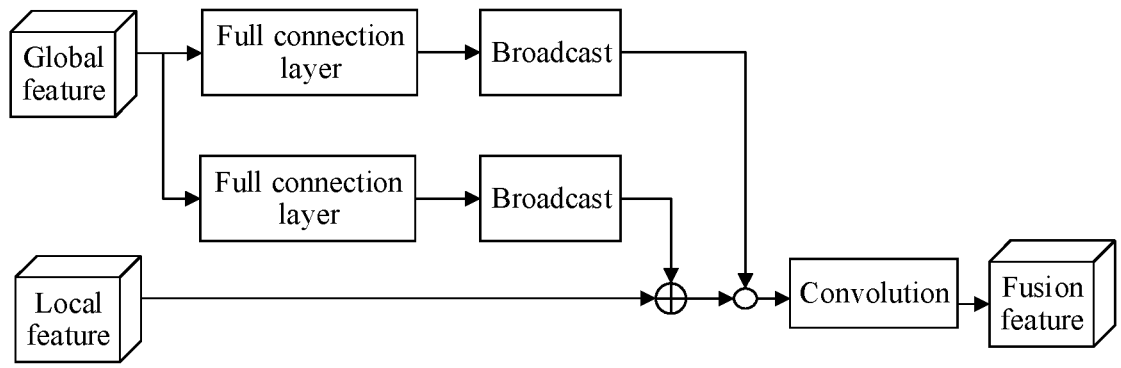
FIG. 12 is a schematic block diagram of feature fusion according to an embodiment of this application.

For example, as shown in FIG. 12, the global feature may be processed through two independent full connection layers, to produce two global features (namely, the first global feature and the second global feature). One of the two global features may be first added to the local features, and then concatenation and convolution are performed on an addition result and the other of the two global features, to obtain a fusion feature.

Manner 2:

Optionally, feature extraction may be performed on the global feature, to obtain a first global feature and a second global feature; concatenation and convolution may be performed on the first global feature and the local features, to obtain a candidate fusion feature; and addition may be performed on the candidate fusion feature and the second global feature, to obtain the fusion feature.

Figure 13:
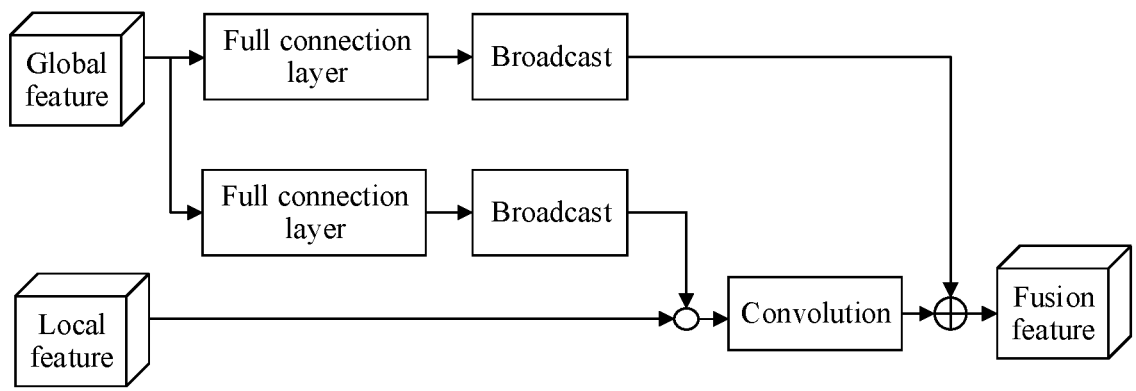
FIG. 13 is a schematic block diagram of feature fusion according to another embodiment of this application.

For example, as shown in FIG. 13, the global feature may be processed through two independent full connection layers, to produce two global features (namely, the first global feature and the second global feature). Concatenation and convolution may be first performed on one of the two global features and the local features, and then a result of the concatenation and convolution is added to one of the two global features, to obtain the fusion feature.

In the foregoing fusion manners, namely, the manner 1 and the manner 2, after the global feature is divided into two independent channels (namely, the first global feature and the second global feature), the first global feature and the second global feature are fused with the local features, so that the model can learn more accurate global information, and color transition of different illumination and different semantic in the to-be-processed image can be more natural.

Optionally, when the to-be-processed image is the image obtained after the original image of the to-be-processed image is downsampled, the performing image enhancement processing on the to-be-processed image based on the global feature and the local features, to obtain an image-enhanced output image may include: performing image enhancement processing on the original image of the to-be-processed image based on the global feature and the local features, to obtain the image-enhanced output image.

Optionally, when the to-be-processed image is the image obtained after the original image of the to-be-processed image is downsampled, the performing image enhancement processing on the to-be-processed image based on the fusion feature, to obtain the image-enhanced output image may include: upsampling the fusion feature based on the original image of the to-be-processed image, to obtain a target fusion feature; and performing image enhancement processing on the original image of the to-be-processed image based on the target fusion feature, to obtain the image-enhanced output image.

In the image enhancement method in the embodiments of this application, a plurality of images having different pixel values are obtained by adjusting the pixel value of the to-be-processed image, and image quality enhancement processing is performed on the to-be-processed image by using the plurality of images having different pixel values, so that more local detail information can be obtained from the plurality of images having different pixel values, to implement image enhancement on the to-be-processed image. The method can improve the effect of image quality enhancement processing.

FIG. 6 is a schematic block diagram of an image enhancement apparatus according to an embodiment of this application. It should be understood that a model shown in FIG. 6 is merely an example and is not construed as a limitation, and the model in FIG. 6 may include more or fewer units or modules. This is not limited in this embodiment of this application.

In this embodiment of this application, the image enhancement apparatus in FIG. 6 may be used to perform image enhancement on the to-be-processed image. A specific image enhancement process may be as follows:

As shown in FIG. 6, after the original image of the to-be-processed image is processed by the downsampling unit 100, a low-resolution image, namely, the to-be-processed image, can be obtained.

Optionally, after the to-be-processed image is processed by the semantic segmentation unit 200, a semantic segmentation graph can be obtained; and the semantic segmentation graph is processed by the semantic condition generation unit 301, to obtain a semantic condition. The semantic condition may include semantic information of the to-be-processed image.

Optionally, after the to-be-processed image is processed by the local feature extraction unit 302, a local feature of the to-be-processed image can be obtained. The local feature extraction unit 302 may be implemented by using a neural network.

For example, the structure of the local feature extraction unit 302 may be shown in FIG. 7.

Further, when the local feature extraction unit 302 is used to extract the local feature of the to-be-processed image, the semantic information of the to-be-processed image may be introduced. Optionally, when the local feature extraction unit 302 is used to extract the local feature of the to-be-processed image, the semantic condition may be introduced.

For example, as shown in FIG. 8, the semantic condition may be introduced into processing of the residual block. A specific implementation of the residual block may be shown in FIG. 9 and FIG. 10.

Optionally, an overexposed image corresponding to the to-be-processed image and an underexposed image corresponding to the to-be-processed image may be obtained through an overexposure processing unit 303 and an underexposure processing unit 305.

The overexposure processing unit 303 and the underexposure processing unit 305 may change the pixel value of the to-be-processed image through non-linear transformation.

For example, the overexposure processing unit 303 and the underexposure processing unit 305 may change the pixel value of the to-be-processed image through gamma transformation.

Optionally, the local feature of the overexposed image may be extracted by the local feature extraction unit 304, and the local feature of the underexposed image may be extracted by the local feature extraction unit 306.

The local feature extraction unit 304 and the local feature extraction unit 306 may have structures shown in FIG. 7 and FIG. 8, or may have other neural network structures in the conventional technology. This is not limited in this embodiment of this application.

Optionally, the global feature of the to-be-processed image may also be extracted by a global feature extraction unit 307.

Optionally, the local feature fusion unit 308 may be used to perform feature fusion on the local feature of the to-be-processed image, the local feature of the overexposed image, and the local feature of the underexposed image, to obtain local fusion feature.

For example, a structure of the local feature fusion unit 308 may be as shown in FIG. 11.

Optionally, a feature fusion unit 309 may be used to fuse the local fusion feature with the global feature of the to-be-processed image, to obtain a fusion feature.

A structure of the feature fusion unit 309 may be as shown in FIG. 12, or the structure of the feature fusion unit 309 may be as shown in FIG. 13.

Optionally, an upsampling unit 400 may be used to perform upsampling processing on the fusion feature based on the original image of the to-be-processed image, to obtain a full-resolution fusion feature.

It should be understood that the full-resolution fusion feature herein means that the full-resolution fusion feature and the original image of the to-be-processed image can be processed through a calculation method in the conventional technology, to obtain an image-enhanced output image, and the resolution of the output image may be the same as that of the original image of the to-be-processed image.

Optionally, after the original image of the to-be-processed image and the full-resolution feature are processed by a full resolution calculation unit 500, the image-enhanced output image can be obtained. For an implementation of the full resolution calculation unit 500, refer to the conventional technology. This is not described in detail in this embodiment of this application.

The image enhancement apparatus in FIG. 6 may be pre-trained. In this embodiment of this application, the image enhancement apparatus can be trained by using the following loss function which specifically is as follows:

$$L^{mix}=L^{content}\alpha*L^{visual}\beta*L^{aesthetic}\gamma*L^{grad}+\rho*L^{saturation}+\sigma*L^{regularization}$$

$\alpha$, $\beta$, $\gamma$, $\rho$, and $\sigma$ and are hyper-parameters, $L^{mix}$ is the foregoing loss function, $L^{content}$ is content fidelity (a content loss), $L^{visual}$ is visual friendliness (a visual loss), $L^{aesthetic}$ is aesthetic quantity (an aesthetic loss) $L^{grad}$ is a gradient constraint (a gradient loss), $L^{saturation}$ is a saturation constraint (saturation loss) $L^{regularization}$ is an L1 regularization constraint, and specifically:

$$L^{content}=|\text{enhanced}-GT|$$

enhanced is the image-enhanced output image, GT is a ground truth, and $L^{content}$ uses an L1 normal form to perform pixel-level constraint on enhanced and GT.

$$L^{visual}=\text{MSSIM}(\text{enhanced GT})$$

MSSI (·) is a multi-scale-structural similarity index (MS-SSIM), and MMSIM (·) is used to evaluate enhanced and GT.

$$L^{aesthetic}=N-\text{Aesthetic}(\text{enhanced})$$

N is a highest score of aesthetic evaluation, and Aesthetic (enhanced) is an aesthetic score of the image-enhanced output image.

$$L^{grad}=|\text{grad}(\text{input})-\text{grad}(\text{enhanced})|$$

input is the input image (namely, the original image of the to-be-processed image), and grad(·) is gradient calculation to calculate gradients of input and enhanced in a flat region, to suppress a video flicker in the flat region.

$$L^{saturation}=w*|\text{enhanced}-\text{input}|+(1-w)*|\text{enhanced}-GT|$$

w is a weight coefficient, a saturation constraint is performed in a human-eye subjectively-sensitive region (for example, a face or the sky), a saturation weight curve is used, and input and GT are weighted by using enhanced to calculate a loss.

$$L^{regularization}=\gamma\|\omega\|_1=\Sigma_i|\omega_i|$$

$\|\ \|_1$ is an L1 norm, $|\ |$ means to obtain an absolute value, $\gamma$ represents a weight of a norm $\|\omega\|_1$ in the loss function, $\omega$ represents weights of all neural networks, $\omega_i$ represents a weight of an ith neural network, i is a positive integer, and $L^{regularization}$ is an L1 regularization constraint, so that networks are sparser, and a difference between adjacent picture frames in a video is not amplified too much, thereby suppressing global and local flickers of the video.

Figure 14:
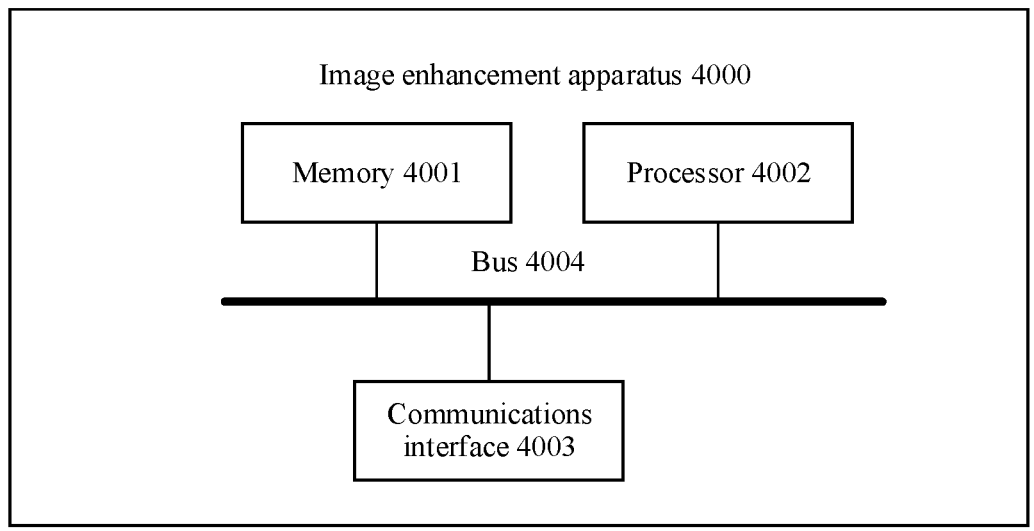
FIG. 14 is a schematic diagram of a hardware structure of an image enhancement apparatus according to an embodiment of this application.

FIG. 14 is a schematic diagram of a hardware structure of an image enhancement apparatus according to an embodiment of this application. The image enhancement apparatus 4000 shown in FIG. 14 includes a memory 4001, a processor 4002, a communications interface 4003, and a bus 4004. A communication connection is implemented between the memory 4001, the processor 4002, and the communications interface 4003 by using the bus 4004.

The memory 4001 may be a read-only memory (ROM), a static storage device, a dynamic storage device, or a random access memory (RAM). The memory 4001 may store programs, and when the programs stored in the memory 4001 are executed by the processor 4002, the processor 4002 and the communications interface 4003 are configured to execute the steps of the image enhancement apparatus in the embodiments of this application.

The processor 4002 may be a general-purpose central processing unit (CPU), a microprocessor, an application-specific integrated circuit (ASIC), a graphics processing unit (GPU), or one or more integrated circuits. The processor 4002 is configured to execute a related program, to implement functions that need to be performed by the units in the image enhancement apparatus in this embodiment of this application, or perform the image enhancement method in the embodiments of this application.

The processor 4002 may be an integrated circuit chip and has a signal processing capability. In an implementation process, the steps of the image enhancement method in the embodiments of this application may be completed by using an integrated logic circuit in a form of hardware or instructions in a form of software in the processor 4002.

The foregoing processor 4002 may be a general-purpose processor, a digital signal processor (DSP), an ASIC, a field-programmable gate array (FPGA) or another programmable logic device, a discrete gate or a transistor logic device, or a discrete hardware component. The foregoing general-purpose processor may be a microprocessor, any conventional processor, or the like. The steps of the methods disclosed in the embodiments of this application may be directly performed by a hardware decoding processor, or performed by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 4001, and the processor 4002 reads information in the memory 4001, and combines hardware of the processor, to complete functions to be performed by units included in the image enhancement apparatus in the embodiments of this application, or perform the image enhancement method in the embodiments of this application.

The communications interface 4003 uses a transceiver apparatus, for example but not limited to, a transceiver, to implement communication between the apparatus 4000 and another device or a communications network. For example, a to-be-processed image may be obtained by using the communications interface 4003.

The bus 4004 may include a channel through which information is transmitted between components (for example, the memory 4001, the processor 4002, and the communications interface 4003) of the apparatus 4000.

Figure 15:
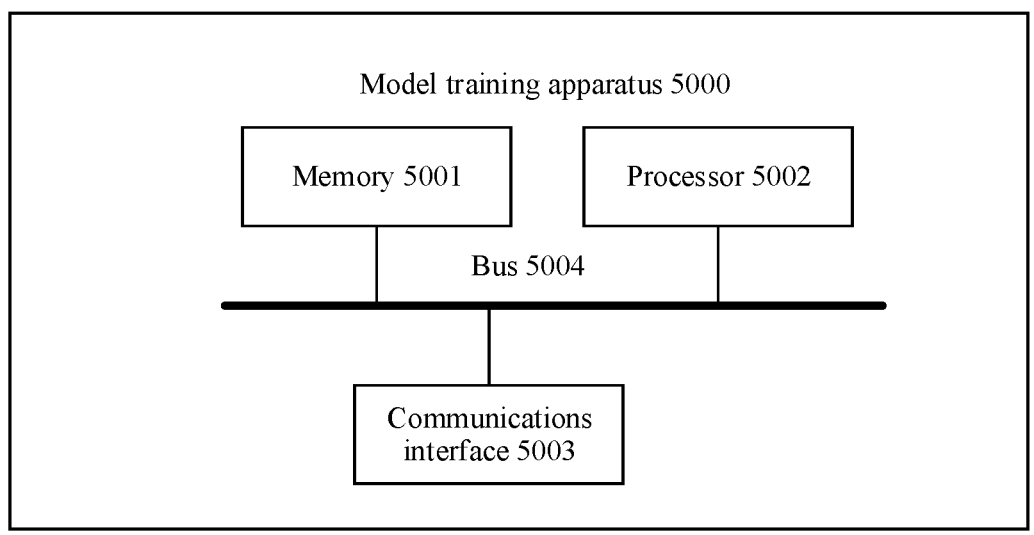
FIG. 15 is a schematic diagram of a hardware structure of a model training apparatus according to an embodiment of this application.

FIG. 15 is a schematic diagram of a hardware structure of a model training apparatus 5000 according to an embodiment of this application. Similar to the apparatus 4000, the model training device 5000 shown in FIG. 15 includes a memory 5001, a processor 5002, a communications interface 5003, and a bus 5004. A communication connection is implemented between the memory 5001, the processor 5002, and the communications interface 5003 by using the bus 5004.

The memory 5001 may store a program. When the program stored in the memory 5001 is executed by the processor 5002, the processor 5002 is configured to perform the steps of a training method for training the image enhancement apparatus in the embodiments of this application.

The processor 5002 may be a general-purpose CPU, a microprocessor, an ASIC, a GPU, or one or more integrated circuits, and is configured to execute a related program, so as to implement the training method for training the image enhancement apparatus in the embodiments of this application.

The processor 5002 may be an integrated circuit chip and has a signal processing capability. In a training implementation process, steps of the training method of the image enhancement apparatus in the embodiments of this application can be implemented by using a hardware integrated logic circuit or an instruction in a form of software in the processor 5002.

It should be understood that the image enhancement apparatus is trained by using the model training device 5000 shown in FIG. 15, and the trained image enhancement apparatus can be used to perform the image enhancement method in the embodiments of this application. Specifically, the apparatus 5000 trains a neural network, so that the image enhancement apparatus in the method shown in FIG. 5 or the image enhancement apparatus shown in FIG. 6 can be obtained.

Specifically, the apparatus shown in FIG. 15 can obtain training data and a to-be-trained image enhancement apparatus from the outside through the communications interface 5003, and then the processor trains the to-be-trained image enhancement apparatus based on the training data.

It should be noted that although only the memory, the processor, and the communications interface of each of the apparatuses 4000 and 5000 are illustrated, in a specific implementation process, a person skilled in the art should understand that the apparatus 4000 and the apparatus 5000 each may further include other components necessary for implementing normal operation. In addition, according to a specific requirement, a person skilled in the art should understand that the apparatus 4000 and apparatus 5000 may further include hardware components for implementing other additional functions. In addition, a person skilled in the art should understand that the apparatus 4000 and the apparatus 5000 may include only components required for implementing the embodiments of this application, and do not need to include all components shown in FIG. 14 and FIG. 15.

It should be understood that, the processor in the embodiments of this application may be a central processing unit (CPU). The processor may further be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor or the processor may be any conventional processor, or the like.

It should be further understood that, the memory in the embodiments of this application may be a volatile memory or a nonvolatile memory, or may include a volatile memory and a nonvolatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external high-speed cache. For example but not for limitation, many forms of random access memories (RAMs) are available, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The foregoing embodiments may be all or partly implemented by software, hardware, firmware, or any other combinations. When the software is used to implement the embodiments, all or some of the foregoing embodiments may be implemented in a form of a computer program product. The computer program product includes one or more computer instructions or computer programs. When the computer program instructions or the computer programs are loaded and executed on the computer, the procedures or functions according to the embodiments of this application are all or partially generated. The computer may be a general-purpose computer, a dedicated computer, a computer network, or another programmable apparatus. The computer instruction may be stored in a computer readable storage medium, or transmitted from one computer readable storage medium to another computer readable storage medium. For example, the computer instruction may be transmitted from one website, computer, server, or data center to another website, computer, server, or data center in a wired (for example, infrared, wireless, or microwave) manner. The computer readable storage medium may be any available medium accessible by a computer, or a data storage device such as a server or a data center including one or more available medium sets. The available medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually represents an "or" relationship between the associated objects, or may represent an "and/or" relationship. A specific meaning depends on a context.

In this application, "at least one" means one or more, and "a plurality of" means two or more. "At least one of the following items (pieces)" or a similar expression thereof refers to any combination of these items, including any combination of singular items (pieces) or plural items (pieces). For example, at least one item (piece) of a, b, and c may indicate: a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation to the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed systems, apparatuses, and methods may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (that may be a personal computer, a server, a network device, or the like) to perform all or some of the steps of the methods described in the embodiments of this application. The storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image enhancement method, comprising:
obtaining K images based on a to-be-processed image, wherein K is a positive integer greater than 1, wherein the to-be-processed image comprises a plurality of pixels, wherein each of the K images is obtained by increasing all pixel values or decreasing all pixel values of the to-be-processed image, and wherein corresponding pixels of the K images have different pixel values;
performing semantic segmentation on the to-be-processed image, to obtain a semantic segmentation graph;
performing feature extraction on the semantic segmentation graph to obtain a semantic condition, wherein the semantic condition comprises semantic information of the to-be-processed image;
extracting a set of local features from each image of the K images, wherein, for each image of the K images, at least one local feature of the set of local features is determined based on a residual estimated value, wherein the residual estimated value is determined by a residual block that extracts a corresponding local feature and is conditioned on the semantic condition;
extracting a global feature of the to-be-processed image, wherein the global feature is associated with the to-be-processed image; and
performing image enhancement processing on the to-be-processed image based on the global feature and the sets of local features of the K images, to obtain an image-enhanced output image.

2. The method according to claim 1, wherein the obtaining the K images comprises:
increasing all pixel values or decreasing all pixel values of the to-be-processed image through one or more non-linear transformations.

3. The method according to claim 1, wherein at least one local feature of the set of local features is extracted from each image of the K images based on a first semantic feature and a second semantic feature, wherein the first semantic feature and the second semantic feature are determined based on the semantic condition.

4. The method according to claim 3, wherein the residual estimated value is determined based on the first semantic feature, the second semantic feature, and an image feature of the to-be-processed image.

5. The method according to claim 1, further comprising:
performing feature fusion on the sets of local features of the K images, to obtain a local fusion feature; and
wherein the performing image enhancement processing on the to-be-processed image to obtain the image-enhanced output image comprises:
performing image enhancement processing on the to-be-processed image based on the global feature and the local fusion feature, to obtain the image-enhanced output image.

6. The method according to claim 1, wherein the performing image enhancement processing on the to-be-processed image to obtain the image-enhanced output image comprises:
performing feature fusion on the global feature and the sets of local features of the K images, to obtain a fusion feature; and
performing image enhancement processing on the to-be-processed image based on the fusion feature, to obtain the image-enhanced output image.

7. The method according to claim 6, wherein the performing feature fusion on the global feature and the sets of local features of the K images, to obtain the fusion feature comprises:
performing feature extraction on the global feature, to obtain a first global feature and a second global feature;
performing addition on the first global feature and the sets of local features, to obtain a candidate fusion feature; and
performing concatenation and convolution on the candidate fusion feature and the second global feature, to obtain the fusion feature.

8. The method according to claim 6, wherein the performing feature fusion on the global feature and the sets of local features of the K images, to obtain the fusion feature comprises:
performing feature extraction on the global feature, to obtain a first global feature and a second global feature;
performing concatenation and convolution on the first global feature and the sets of local features, to obtain a candidate fusion feature; and
performing addition on the candidate fusion feature and the second global feature, to obtain the fusion feature.

9. The method according to claim 1,
wherein the to-be-processed image is an image obtained after an original image of the to-be-processed image is downsampled,
wherein the performing image enhancement processing on the to-be-processed image to obtain the image-enhanced output image comprises:
performing image enhancement processing on the original image of the to-be-processed image based on the global feature and the sets of local features of the K images, to obtain the image-enhanced output image.

10. An image enhancement apparatus, comprising:
a processor; and
a memory, wherein the memory is configured to store program instructions, and the processor is configured to invoke the program instructions to perform a method comprising:
obtaining K images based on a to-be-processed image, wherein K is a positive integer greater than 1, wherein the to-be-processed image comprises a plurality of pixels, wherein each of the K images is obtained by increasing all pixel values or decreasing all pixel values of the to-be-processed image, and wherein corresponding pixels of the K images have different pixel values;
performing semantic segmentation on the to-be-processed image, to obtain a semantic segmentation graph;
performing feature extraction on the semantic segmentation graph to obtain a semantic condition, wherein the semantic condition comprises semantic information of the to-be-processed image;

extracting a set of local features from each image of the K images, wherein, for each image of the K images, at least one local feature of the set of local features is determined based on a residual estimated value, wherein the residual estimated value is determined by a residual block that extracts a corresponding local feature and is conditioned on the semantic condition;

extracting a global feature of the to-be-processed image, wherein the global feature is associated with the to-be-processed image; and performing image enhancement processing on the to-be-processed image based on the global feature and the sets of local features of the K images, to obtain an image-enhanced output image.

11. The apparatus according to claim 10, wherein the obtaining the K images comprises:

increasing all pixel values or decreasing all pixel values of the to-be-processed image through one or more non-linear transformations.

12. The apparatus according to claim 10, wherein at least one local feature of the set of local features is extracted from each image of the K images based on a first semantic feature and a second semantic feature, wherein the first semantic feature and the second semantic feature are determined based on the semantic condition.

13. The apparatus according to claim 12, wherein the residual estimated value is determined based on the first semantic feature, the second semantic feature, and an image feature of the to-be-processed image.

14. The apparatus according to claim 10, wherein the method further comprises:

performing feature fusion on the sets of local features of the K images, to obtain a local fusion feature; and wherein the performing image enhancement processing on the to-be-processed image to obtain the image-enhanced output image comprises:

performing image enhancement processing on the to-be-processed image based on the global feature and the local fusion feature, to obtain the image-enhanced output image.

15. The apparatus according to claim 10, wherein the performing image enhancement processing on the to-be-processed image to obtain the image-enhanced output image comprises:

performing feature fusion on the global feature and the sets of local features of the K images, to obtain a fusion feature; and performing image enhancement processing on the to-be-processed image based on the fusion feature, to obtain the image-enhanced output image.

16. The apparatus according to claim 10, wherein the performing feature fusion on the global feature and the sets of local features of the K images, to obtain the fusion feature comprises:

performing feature extraction on the global feature, to obtain a first global feature and a second global feature;

performing addition on the first global feature and the local features, to obtain a candidate fusion feature; and performing concatenation and convolution on the candidate fusion feature and the second global feature, to obtain the fusion feature.

17. The apparatus according to claim 16, wherein the performing feature fusion on the global feature and the sets of local features of the K images, to obtain the fusion feature comprises:

performing feature extraction on the global feature, to obtain a first global feature and a second global feature;

performing concatenation and convolution on the first global feature and the local features, to obtain a candidate fusion feature; and performing addition on the candidate fusion feature and the second global feature, to obtain the fusion feature.

18. The apparatus according to claim 10, wherein the to-be-processed image is an image obtained after an original image of the to-be-processed image is downsampled, wherein the performing image enhancement processing on the to-be-processed image to obtain the image-enhanced output image comprises:

performing image enhancement processing on the original image of the to-be-processed image based on the global feature and the local features, to obtain the image-enhanced output image.

19. A non-transitory computer-readable storage medium that stores program code to be executed by a device to perform a method comprising:

obtaining K images based on a to-be-processed image, wherein K is a positive integer greater than 1, wherein the to-be-processed image comprises a plurality of pixels, wherein each of the K images is obtained by increasing all pixel values or decreasing all pixel values of the to-be-processed image, and wherein corresponding pixels of the K images have different pixel values;

performing semantic segmentation on the to-be-processed image, to obtain a semantic segmentation graph;

performing feature extraction on the semantic segmentation graph to obtain a semantic condition, wherein the semantic condition comprises semantic information of the to-be-processed image;

extracting a set of local features from each image of the K images, wherein, for each image of the K images, at least one local feature of the set of local features is determined based on a residual estimated value, wherein the residual estimated value is determined by a residual block that extracts a corresponding local feature and is conditioned on the semantic condition;

extracting a global feature of the to-be-processed image, wherein the global feature is associated with the to-be-processed image; and performing image enhancement processing on the to-be-processed image based on the global feature and the sets of local features of the K images, to obtain an image-enhanced output image.

* * * * *